(12) United States Patent
Chan et al.

(10) Patent No.: US 7,660,805 B2
(45) Date of Patent: Feb. 9, 2010

(54) METHOD OF GENERATING DATA SERVERS FOR HETEROGENEOUS DATA SOURCES

(75) Inventors: Sammy Chan, Beecroft (AU); Nicole Ai Ling Lam, Lane Cove (AU); Alison Joan Lennon, Balmain (AU); Jing Wu, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 571 days.

(21) Appl. No.: 11/010,303

(22) Filed: Dec. 14, 2004

(65) Prior Publication Data

US 2005/0149552 A1    Jul. 7, 2005

(30) Foreign Application Priority Data

Dec. 23, 2003  (AU) .............................. 2003907198

(51) Int. Cl.
*G06F 7/00* (2006.01)
*G06F 17/00* (2006.01)

(52) U.S. Cl. ........................... 707/101; 707/4; 707/100; 707/102

(58) Field of Classification Search ...................... 707/1, 707/2, 3, 4, 10, 100–102, 104.1, 201; 715/255
See application file for complete search history.

(56) References Cited

U.S. PATENT DOCUMENTS

| | | | | |
|---|---|---|---|---|
| 5,596,744 | A | 1/1997 | Dao et al. ..................... | 395/610 |
| 5,634,053 | A | 5/1997 | Noble et al. ................. | 395/604 |
| 6,233,586 | B1 | 5/2001 | Chang et al. ................. | 707/103 |
| 6,263,342 | B1 | 7/2001 | Chang et al. ................. | 707/103 |

(Continued)

FOREIGN PATENT DOCUMENTS

JP       2001-92695       4/2001

(Continued)

OTHER PUBLICATIONS

"IBM, XML for Tables" from website <http://www.alphaworks.ibm.com/tech/xtable>, visited Mar. 29, 2005.

(Continued)

*Primary Examiner*—Don Wong
*Assistant Examiner*—Angela M Lie
(74) *Attorney, Agent, or Firm*—Fitzpatrick, Cella, Harper & Scinto

(57) ABSTRACT

A query system (1600) is formed by a wizard (1605) operating to form a data server (1610) arranged to serve data from a data source (1615) to a client application (1630), each of the wizard, the client application, the data server and the data source being linked by a communications network (1650). The data source has native data types and data arranged in a data structure. The wizard operates to firstly identify the data source over the network. The wizard further provides an application program for traversing and examining at least one of the data structure and data of the identified data source. The application program is operable to generate a representative schema (1614) comprising mapping data for converting the native data types to predetermined data types of a common data model. The wizard further operates to create a server application (1612) adapted to use the representative schema to convert the data from the native data types to the predetermined data types and to serve the data to the client application according to the common data model over the network. The representative schema and the server application thereby form the data server generated by the wizard. Once formed, the data server may receive and respond to queries from the client application, which may have no knowledge of the native data types, but which are directed to the data source.

20 Claims, 21 Drawing Sheets

U.S. PATENT DOCUMENTS

| | | | |
|---|---|---|---|
| 6,272,488 B1 | 8/2001 | Chang et al. ............... 707/4 |
| 6,282,537 B1 | 8/2001 | Madnick et al. ............ 707/4 |
| 6,449,620 B1 | 9/2002 | Draper et al. .............. 707/102 |
| 7,260,777 B2* | 8/2007 | Fitzsimons et al. ......... 715/255 |
| 2001/0034733 A1 | 10/2001 | Prompt et al. ............. 707/102 |
| 2002/0133504 A1 | 9/2002 | Vlahos et al. ............. 707/104.1 |
| 2003/0177481 A1 | 9/2003 | Amaru et al. .............. 717/148 |
| 2004/0015783 A1 | 1/2004 | Lennon et al. ............. 715/523 |
| 2004/0148232 A1* | 7/2004 | Fushimi et al. ............ 705/27 |
| 2004/0225632 A1* | 11/2004 | Benson et al. .............. 707/1 |
| 2004/0225670 A1* | 11/2004 | Cameron et al. ............ 707/101 |
| 2005/0050054 A1* | 3/2005 | Clark et al. ................ 707/100 |
| 2005/0096931 A1* | 5/2005 | Baker et al. ................ 705/1 |
| 2005/0234889 A1* | 10/2005 | Fox et al. .................. 707/3 |
| 2008/0040382 A1* | 2/2008 | Morris et al. .............. 707/102 |
| 2008/0140705 A1* | 6/2008 | Luo ......................... 707/103 R |

FOREIGN PATENT DOCUMENTS

JP          2003-186735          7/2003

OTHER PUBLICATIONS

"Altova MapForce" from website <http://www.altova.com/products_mapforce.html>, visited Mar. 29, 2005.

"Qizx/open" from website <http://www.xfra.net/qizxopen/>, visited Mar. 29, 2005.

"XML Schema" from website <http://www.w3.org/XML/Schema.html>, visited Mar. 29, 2005.

"XML Query (XQuery)" from website <http://www.w3.org/XML/Query.html>, visited Mar. 29, 2005.

"J2EE Java Servlet Technology" from website <http://java.sun.com/products/servlet/>, visited Mar. 29, 2005.

"Apache Jakarta Tomcat" from website <http://jakarta.apache.org/tomcat/>, visited Mar. 29, 2005.

"Microsoft Office Online: Outlook 2003 Home Page" from website <http://office.microsoft.com/en-au/FX010857931033.aspx>, visited Mar. 29, 2005.

"XML Path Language (XPath)" from website <http://www.w3.org/TR/xpath>, visited Mar. 29, 2005.

Akira Tomiya, "XML applications using iConnector (1)", DB Magazine, Japan, Shoeisha Co., Ltd., Jul. 1, 2001, vol. 11 Issue 3, pp. 207-211.

Hisayuki Igeta, "Nut & bolts of linking XML and Databases", DB Magazine, Japan, Shoeisha Co., Ltd., Sep. 1, 2002, vol. 12, Issue 6, pp. 174-178.

Jun Kuwada et al., "Processing Queries Including User-defined Foreign Functions on XML Views over Relational Databases", No. SIG12 (TOD16) Transactions of IPSJ, Japan, Information Processing Society of Japan, Dec. 15, 2002, vol. 43, pp. 16-37.

Japanese Office Action dated Mar. 14, 2008 in Japanese application No. 2004-374615.

Hisayuki Igeta, "Nut & bolts of linking XML and Databases", DB Magazine, Sep. 1, 2002, pp. 174-178, vol. 12, Issue 6, Shoeisha Co., Ltd., japan (originally submitted with the Information Disclosure Statement dated Apr. 11, 2008; English-language translation submitted herewith).

Akira Tomiya, "XML Applications Using iConnector (1)", DB Magazine, Jul. 1, 2001, pp. 207-211, vol. 11, Issue 3, Shoeisha Co., Ltd., Japan (originally submitted with the Information Disclosure Statement dated Apr. 11, 2008; English-language translation submitted herewith).

* cited by examiner

METHOD OF GENERATING DATA SERVERS FOR HETEROGENEOUS DATA SOURCES

CROSS-REFERENCE TO RELATED PATENT APPLICATION

This application claims the right of priority under 35 U.S.C. § 119 based on Australian Patent Application No. 2003907198, filed 23 Dec. 2003, which is incorporated by reference herein in its entirety as if fully set forth herein.

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates to the integration of information retained within heterogeneous data sources. More particularly, disclosed is a mapping of a native data model of a data source to a common data model, and the generation of a server application that provides access to a data source based on the common data model.

BACKGROUND

The problem of accessing heterogeneous data sources in an integrated manner has typically been approached by representing the data in the participating heterogeneous data sources in a common data model. This involves mapping the native schemas of each data source to schemas in the common data model. In this specification, the term "native" means a language or schema peculiar to the specific data source. The integration of the participating heterogeneous data sources is enabled by having a common method to query the data sources and by allowing a single query to retrieve an integrated result from multiple data sources.

The process of enabling a heterogeneous data source for integrated access typically involves the following two steps.
1. At setup time, the native schema of a data source is mapped to a schema in the common data model. Typically, this step is performed manually by a person with expert knowledge of the data source using a software tool.
2. At runtime the data in a data source is mapped from its native schema to the mapped schema in the common data model by a data mapper process. This process often involves translating the query in the common data model to one or more queries or application program interface (API) calls that are processed by the native data source.

A data mapper useful in such a process may take the form of:
(i) a wrapper, which is a software layer that encapsulates the data source and exposes a common API for accessing the data; or
(ii) a data server, which is a network-addressable server application that accepts requests from client applications and then retrieves and processes the data according to the requests.

Typically, data mappers are programmed by a software engineer and deployed by a system administrator. The task of constructing and deploying a data mapper requires much effort and expert knowledge and is typically far beyond the ability of the actual users of the data. The construction of data mappers can be further complicated by the following issues.

First, it is often desirable to allow multiple possible representations of the same data in the common data model. This is often required when the data models of the two schemas are different (e.g., relational and hierarchical). Second, it is often desirable to be able to specify the schema to be used for a data source in the common data model. This is sometimes necessary when the user has the requirement that the schema of a data source enabled for integrated access must have a predetermined structure (e.g., when integrating data from a legacy data source into a system that already has clients accessing other data according to an existing schema).

There are a number of existing methods of providing a common data model, which enable querying of data stored in heterogeneous data sources. U.S. Pat. No. 6,263,342 issued to Chang et al on Jul. 17, 2001, U.S. Pat. No. 6,233,586 issued to Chang et al on May 15, 2001 and U.S. Pat. No. 6,272,488 issued to Chang et al on Aug. 7, 2001 disclose a method where a federated virtual view of the heterogeneous data sources is provided using an object oriented model. Federated query objects are translated into appropriate queries for individual data sources using Java objects. The method of constructing the Java objects for query translation is not disclosed.

U.S. Pat. No. 5,596,744 issued to Dao et al on Jan. 21, 1997 and U.S. Pat. No. 5,634,053 issued to Noble et al on May 27, 1997 provide a similar federated architecture. In these patents, a data dictionary is used to contain information such as schemas (of native data sources), data distribution, domain knowledge and inter-site relationships. This data dictionary is used to translate queries appropriately for individual data sources. However, no method is described for the addition of information for a new data source to the data dictionary.

U.S. Pat. No. 6,282,537 issued to Madnick et al on Aug. 28, 2001 discloses a method of querying heterogeneous data sources containing structured and semi-structured data. An export schema is used to define the data and its format for each individual data source. However, as in the previously mentioned patents, a method of generating the export schema is not described. In each of the above cases, the objective of the disclosure has been to describe the common data model that enabled querying of the heterogeneous data sources. The method by which new data sources are integrated into the common data model is not addressed.

U.S. Patent Application Publication No. 20020133504 by Vlahos et al published Sep. 19, 2002 discloses a method of using a data wrapper to publish data in a data source as virtual tables. An information server is then used to aggregate the virtual tables into a single universal data representation (common data model). Queries directed to the common data model can be translated appropriately and re-directed to individual data wrappers. Although, the information server performs some integration functions (e.g., accumulation, removal of duplication), the patent does not describe how the virtual tables of the data wrapper are constructed for a data source. In other words, the mapping of the data from individual data sources to the common data model is not fully described.

U.S. Patent Application Publication No. 20010034733 by Prompt et al published Oct. 25, 2001 discloses a method which uses a common hierarchical data model and Lightweight Directory Access Protocol (LDAP) as the protocol for accessing the data. It describes the mapping of a relational schema to a hierarchical schema (in the common data model) based on a relationship-driven and an ad-hoc approach. However, the relationship-driven approach does not address the issue of multiple possible mappings which often exist when a relational schema is mapped to a hierarchical schema. More-over, the method does not address the mapping of other non-relational data sources to the common hierarchical data model.

More recently, Extensible Markup Language (XML) is being increasingly used as a common data model (for heterogeneous data sources) with XML query languages being able to query XML data. IBM's Java-based tool "XML for Tables" enables application programmers to use a provided set of Java classes to obtain an XML view of relational tables. Specifically, XML for Tables is designed to operate with IBM's DB2 database technology. Although, XML for Tables enables user defined views (schemas) for the XML data, it remains a tool for programmers. Multiple, different views of the data must be individually programmed with a knowledge of the data source. Furthermore, the tool is designed to be used with relational databases and therefore is limited in its application to heterogeneous data sources.

The arrangements disclosed in the above noted art are non-instructive of a tool by which a user, not necessarily skilled in the art of database management, may create and deploy a data mapper for a selected data source.

SUMMARY

It is an object of the present invention to substantially overcome, or at least ameliorate, one or more disadvantages of existing methods.

The arrangements presently disclosed allow multiple possible mappings from the native schema to the schema in the common data model and the use of a predefined schema in the common data model.

In accordance with one aspect of the present invention, there is disclosed a method of forming a data server for serving data from a data source to a client application over a network, said data source comprising native data types and data arranged in a data structure, said method comprising the steps of:

(i) identifying said data source on said network;

(ii) providing an application program for traversing and examining at least one of the data structure and data of said identified data source, said application program being operable to generate a representative schema comprising mapping data for converting said native data types to predetermined data types of a common data model; and (iii) creating a server application adapted to use said representative schema to convert said data from said native data types to said predetermined data types and to serve said data to said client application according to said common data model over said network;

said representative schema and said server application thereby forming said data server.

Other aspects of the invention are also disclosed.

BRIEF DESCRIPTION OF THE DRAWINGS

At least one embodiment of the present invention will now be described with reference to the drawings and appendices, in which.

Appendix A shows a simplified default XML Schema;

Appendix B shows the default XML Schema of the Company database;

Appendix C shows a predefined XML Schema for which the user wishes to generate a data server from the Company database;

Appendix D shows the predefined XML Schema annotated with mapping information; and Appendix E is a default XML Schema of an Outlook™ data source.

DETAILED DESCRIPTION INCLUDING BEST MODE

The arrangements to be described provide a method for generating data servers for heterogeneous data sources. The method uses an application program, commonly called a wizard, to assist a user to establish data servers, which map queries in a common data model to the native schemas of heterogeneous data sources. The common data model used by the preferred embodiment is XML. Preferably, queries for the common data model are represented using XML Query, or XQuery and the data of each data source is represented in the common data model using an XML Schema. Extensible Markup Language, XML Schema and XQuery are being developed by the World Wide Web Consortium (W3C) to enable interconnectivity of data over networks and applications.

Figure 1:
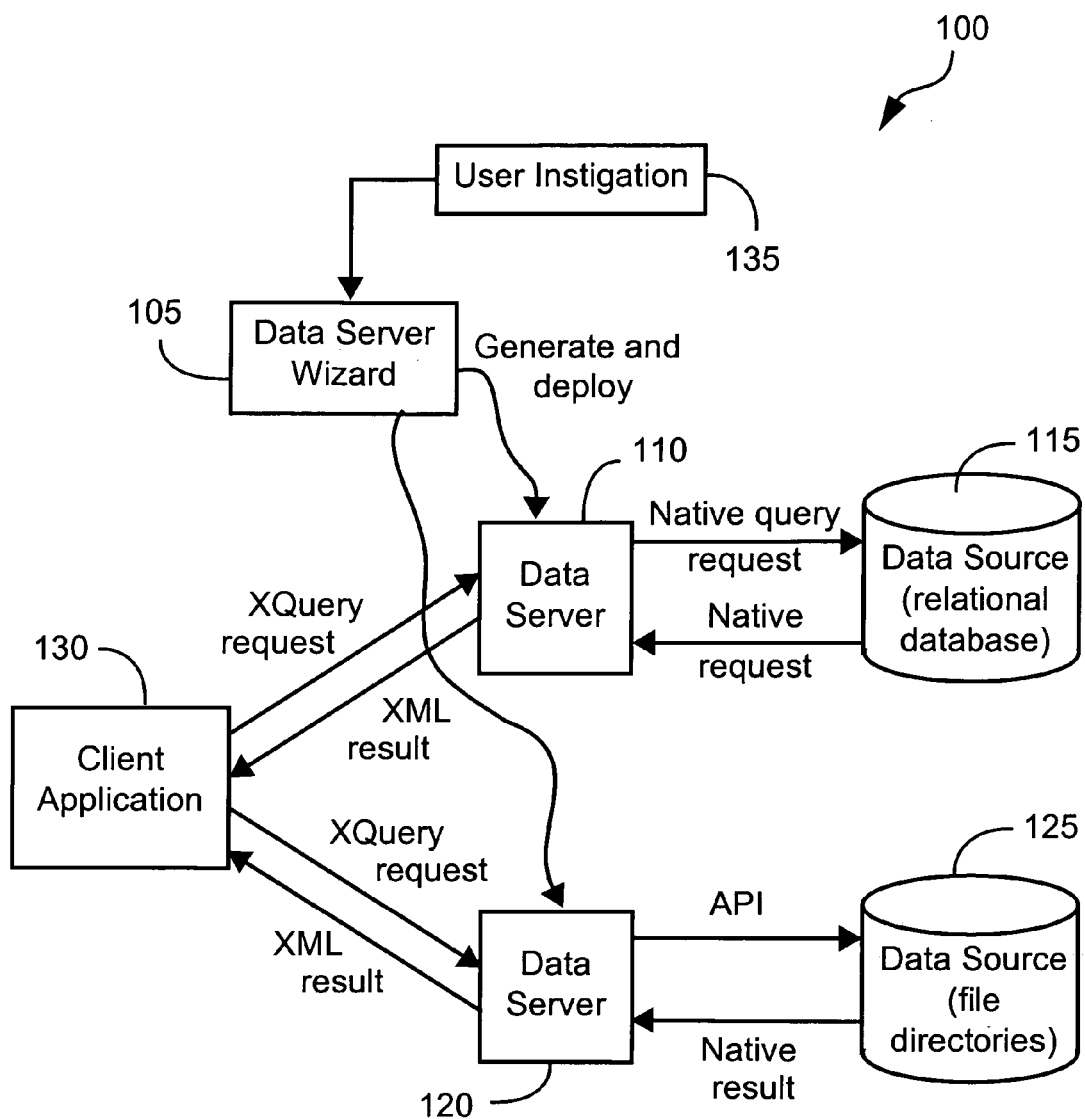
FIG. 1 is a diagram showing the system architecture for accessing heterogeneous data sources.

FIG. 1 shows the system architecture 100 for the preferred arrangement. A data server wizard application 105 may be used to create and deploy a data server 110 for a selected (relational database) data source 115. The data server 110 is a network-addressable server that accepts XQuery requests from one or more client applications 130. The data server 110 retrieves native result data from the data source 115 according to a native query request and then processes and returns the result of the request in XML back to the client application 130. The client application 130 may be any client that can use Hypertext Transfer Protocol (HTTP) to submit an XQuery to a server on a computer network such as the World Wide Web (WWW). Examples of such applications include web browser applications such as Internet Explorer™ by Microsoft Corporation and Netscape™ by Netscape Communications Inc., amongst many others. Another browser application may be that described in Australian Patent Application No. 2003204824, corresponding to U.S. patent application Ser. No. 10/465,222, both entitled "Methods for Interactively Defining Transforms and for Generating Queries by Manipulating Existing Query Data".

The data server wizard 105 is instigated to operate by a user 135 whose computer has been loaded with the wizard 105. The wizard 105 may be sourced from the network or provided on a disk or like medium. Operation of the wizard 105, over the computer network that links the user's computer to the data sources 115 and 125, results in the creation of the data servers 110 and 120 respectively. The servers 110 and 120 are associated, but not necessarily located with the corresponding source 115, 125 and operate to permit any client application 130 within the computer network, for example located on the computer of the user 135, or any other computer, to access the servers 110,120 to provide access to the data sources 115,125.

The described arrangement and method allows a plurality of participating data sources, each of which has a corresponding generated data server, to operate simultaneously. In FIG. 1, only two data sources, being the relational database 115 and a collection of file directories 125, with their corresponding generated data servers 110 and 120 are shown. Both servers 110 and 120 may interact with the client application 130. In an alternate implementation, a plurality of data servers may be generated for a single data source. Each of the generated data servers may present the data using a different schema.

Figure 14:
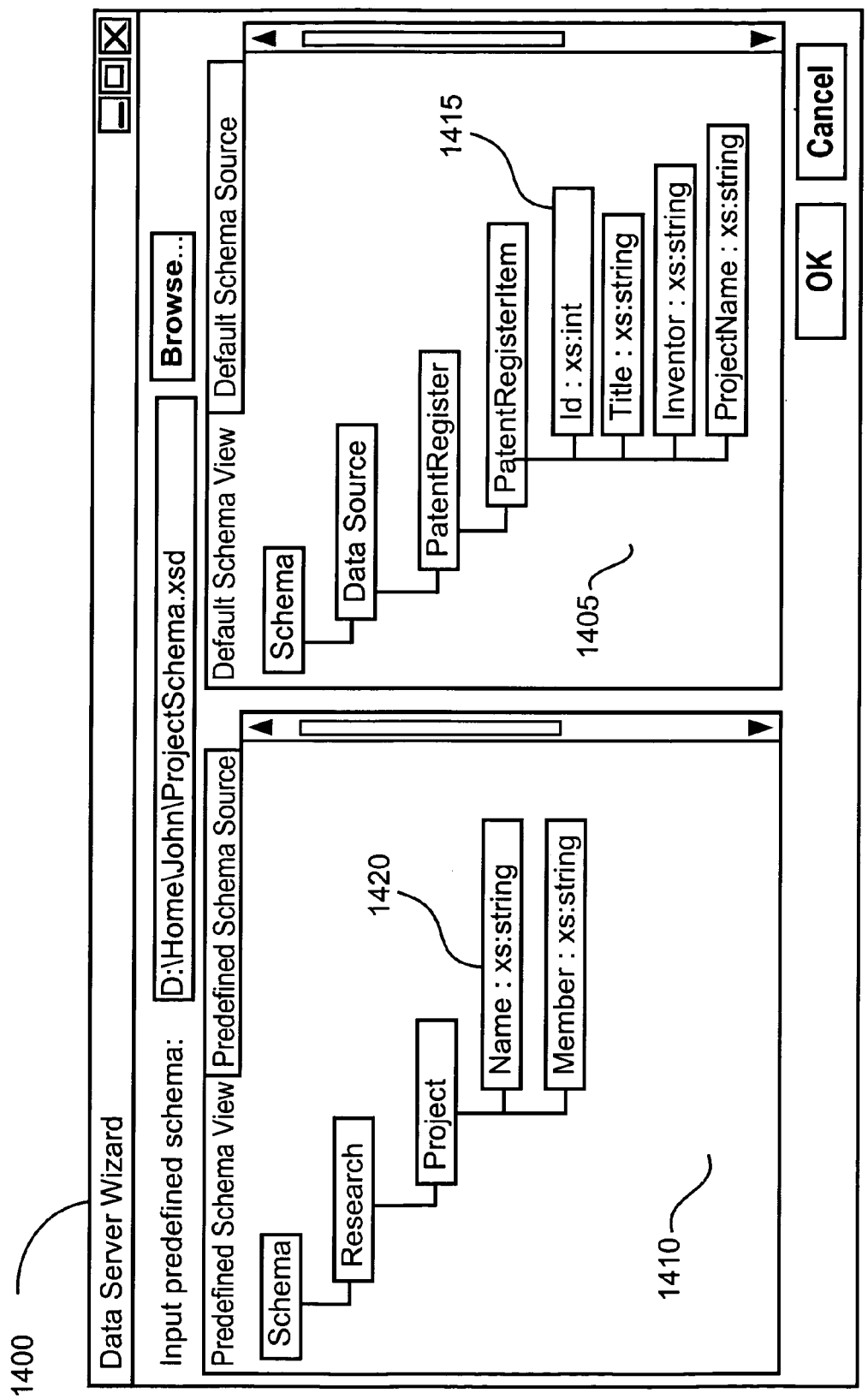
FIG. 14 is a graphical user-interface for mapping a default XML Schema to a predefined XML Schema.
Figure 15:
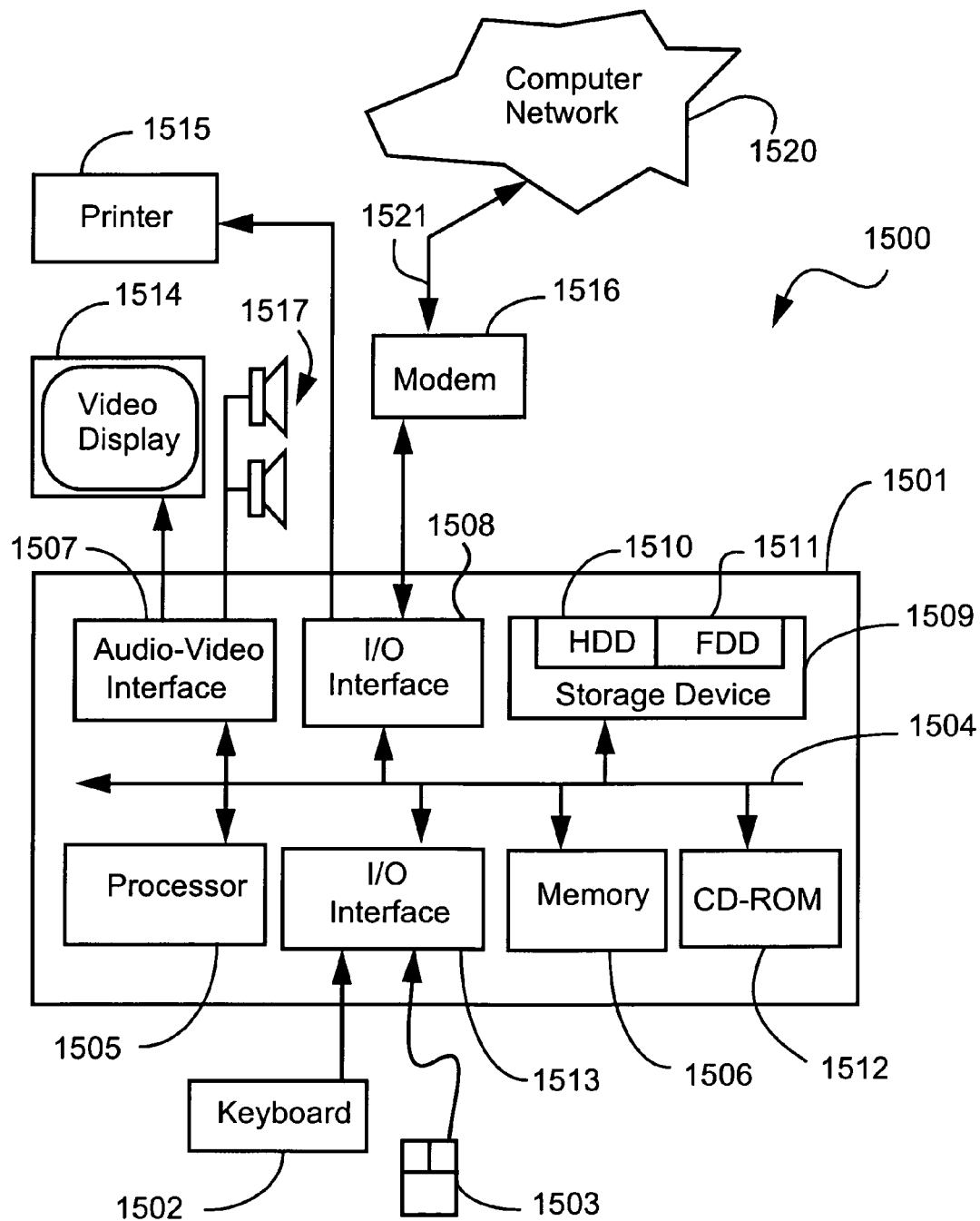
FIG. 15 is a schematic block diagram of a general purpose computer upon which arrangements described can be practiced.

The generation of data servers for heterogeneous data sources implemented by the wizard 105 may be practiced using a general-purpose computer system 1500 operated by the user 135, such as that shown in FIG. 15 wherein the wizard processes of FIGS. 1 to 14 may be implemented as software, such as an application program executing within the computer system 1500. In particular, the steps of the method of generating data servers for heterogeneous data sources are effected by instructions in the software that are carried out by the computer. The instructions may be formed as one or more code modules, each for performing one or more particular tasks. The software may also be divided into two separate parts, in which a first part performs the wizard methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for generating data servers for heterogeneous data sources.

The computer system 1500 is formed by a computer module 1501, input devices such as a keyboard 1502 and mouse 1503, output devices including a printer 1515, a display device 1514 and loudspeakers 1517. A Modulator-Demodulator (Modem) transceiver device 1516 is used by the computer module 1501 for communicating to and from a communications network 1520, for example connectable via a telephone line 1521 or other functional medium. The modem 1516 can be used to obtain access to the Internet, and other network systems, such as a Local Area Network (LAN) or a Wide Area Network (WAN), and may be incorporated into the computer module 1501 in some implementations.

The computer module 1501 typically includes at least one processor unit 1505, and a memory unit 1506, for example formed from semiconductor random access memory (RAM) and read only memory (ROM). The module 1501 also includes an number of input/output (I/O) interfaces including an audio-video interface 1507 that couples to the video display 1514 and loudspeakers 1517, an I/O interface 1513 for the keyboard 1502 and mouse 1503 and optionally a joystick (not illustrated), and an interface 1508 for the modem 1516 and printer 1515. In some implementations, the modem 1516 may be incorporated within the computer module 1501, for example within the interface 1508. A storage device 1509 is provided and typically includes a hard disk drive 1510 and a floppy disk drive 1511. A magnetic tape drive (not illustrated) may also be used. A CD-ROM drive 1512 is typically provided as a non-volatile source of data. The components 1505 to 1513 of the computer module 1501, typically communicate via an interconnected bus 1504 and in a manner which results in a conventional mode of operation of the computer system 1500 known to those in the relevant art. Examples of computers on which the described arrangements can be practised include IBM-PC's and compatibles, Sun Sparcstations or alike computer systems evolved therefrom.

Typically, the application program is resident on the hard disk drive 1510 and read and controlled in its execution by the processor 1505. Intermediate storage of the program and any data fetched from the network 1520 may be accomplished using the semiconductor memory 1506, possibly in concert with the hard disk drive 1510. In some instances, the application program may be supplied to the user encoded on a CD-ROM or floppy disk and read via the corresponding drive 1512 or 1511, or alternatively may be read by the user from the network 1520 via the modem device 1516. Still further, the software can also be loaded into the computer system 1500 from other computer readable media. The term "computer readable storage medium" as used herein refers to any storage medium that participates in providing instructions and/or data to the computer system 1500 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1501. Examples of transmission media include radio or infra-red transmission channels as well as a network connection to another computer or networked device, and the Internet or Intranets including e-mail transmissions and information recorded on Websites and the like.

A particular instance of the computer system 1500 may thus form a hardware foundation for each data source 115, 125. Such, in turn, may provide a platform for hosting the corresponding data server 110, 120. Alternatively, the data servers 110, and 120 may be hosted on respective computer systems 1500 separate from those operating the data sources 115 and 125. A further instance of the computer system 1500 may support the client application 130 and a yet further instance may support the data server wizard 105. In this fashion, the communications and links shown in FIG. 1 may be performed or structured over the network 1520 between the respective computer devices.

Figure 2:
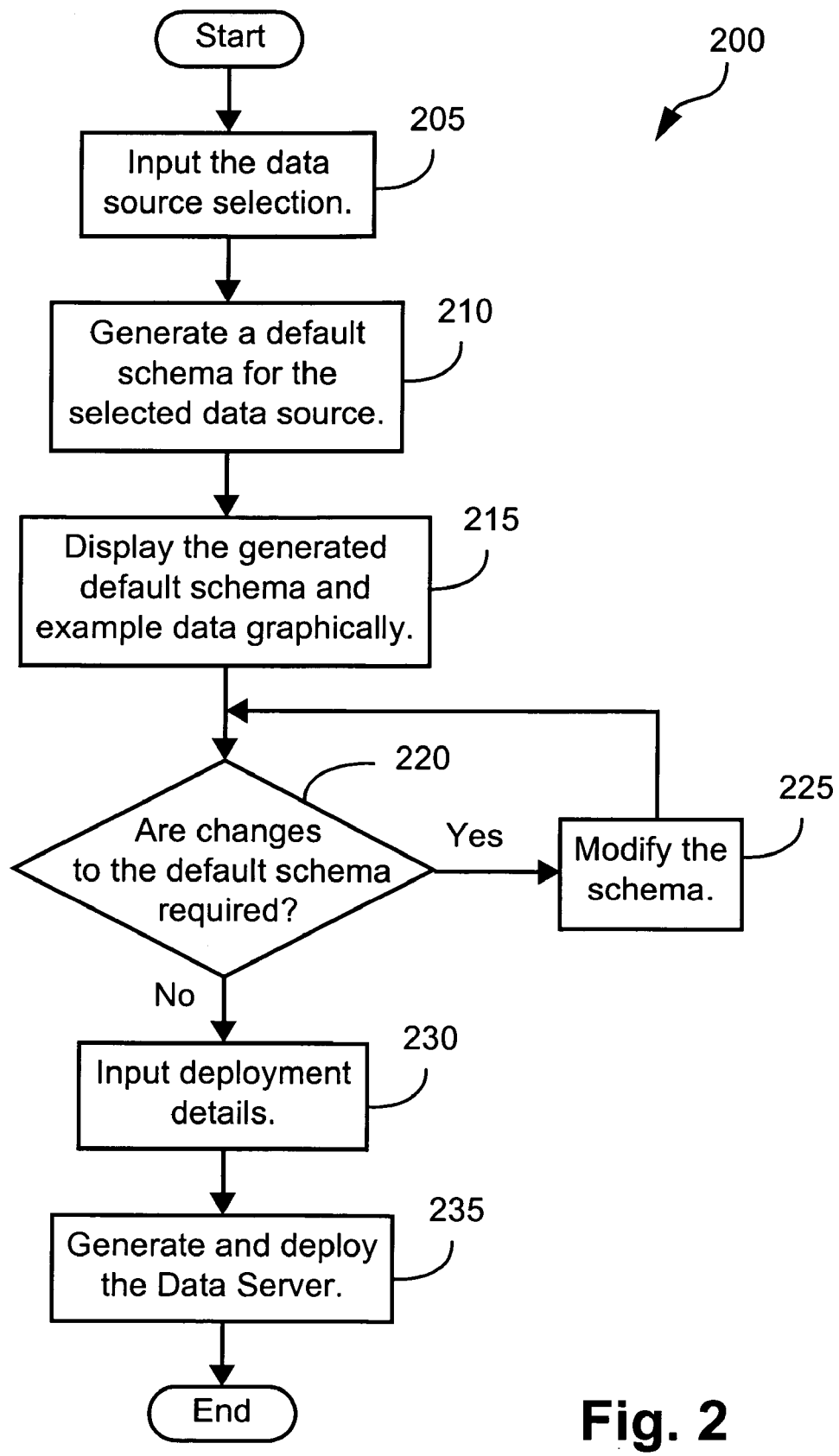
FIG. 2 is a flowchart of a method for generating a data server having a default schema.
Figure 17:
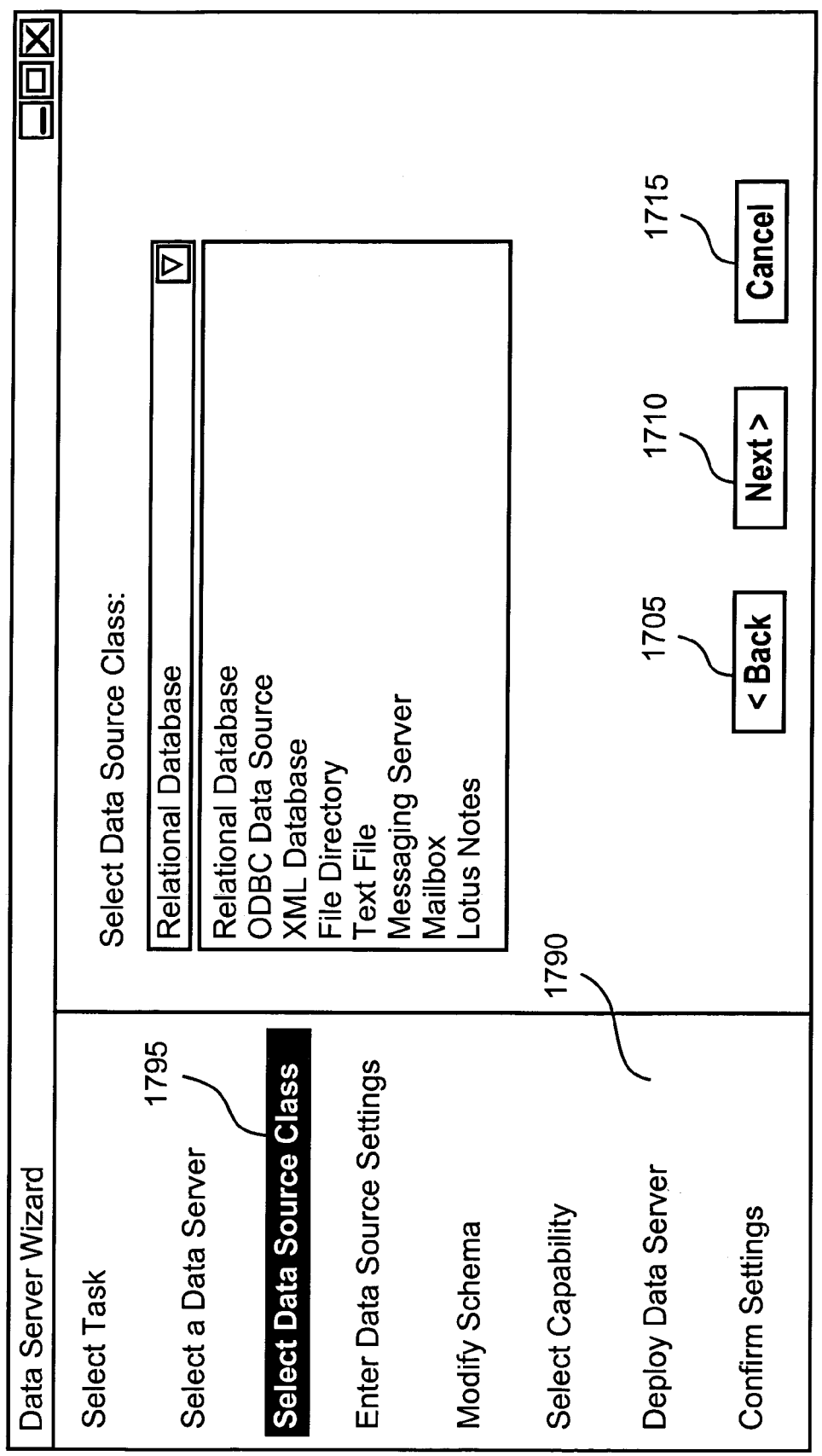
FIG. 17 is an illustration of the data server wizard window for selecting a data source type of the data source for which a data server is to be generated.

FIG. 2 shows a flowchart depicting the preferred method 200 for generating a data server. The method 200 is implemented as a computer program called the data server wizard 105. The data server wizard 105 interacts with user requests and commands emanating from the user's instructions entered via the computer 1500. At an initial step 205, the data server wizard 105 receives the user's selection of a data source. This involves the user selecting one of the supported data source types from a list in the data server wizard 105 window as shown in FIG. 17. The panel 1790 on the left hand side of the screen in FIG. 17 shows the steps that the data server wizard 105 must perform in order to construct and deploy a data server 110. The current step 1795 is shown in bold.

Figure 18:
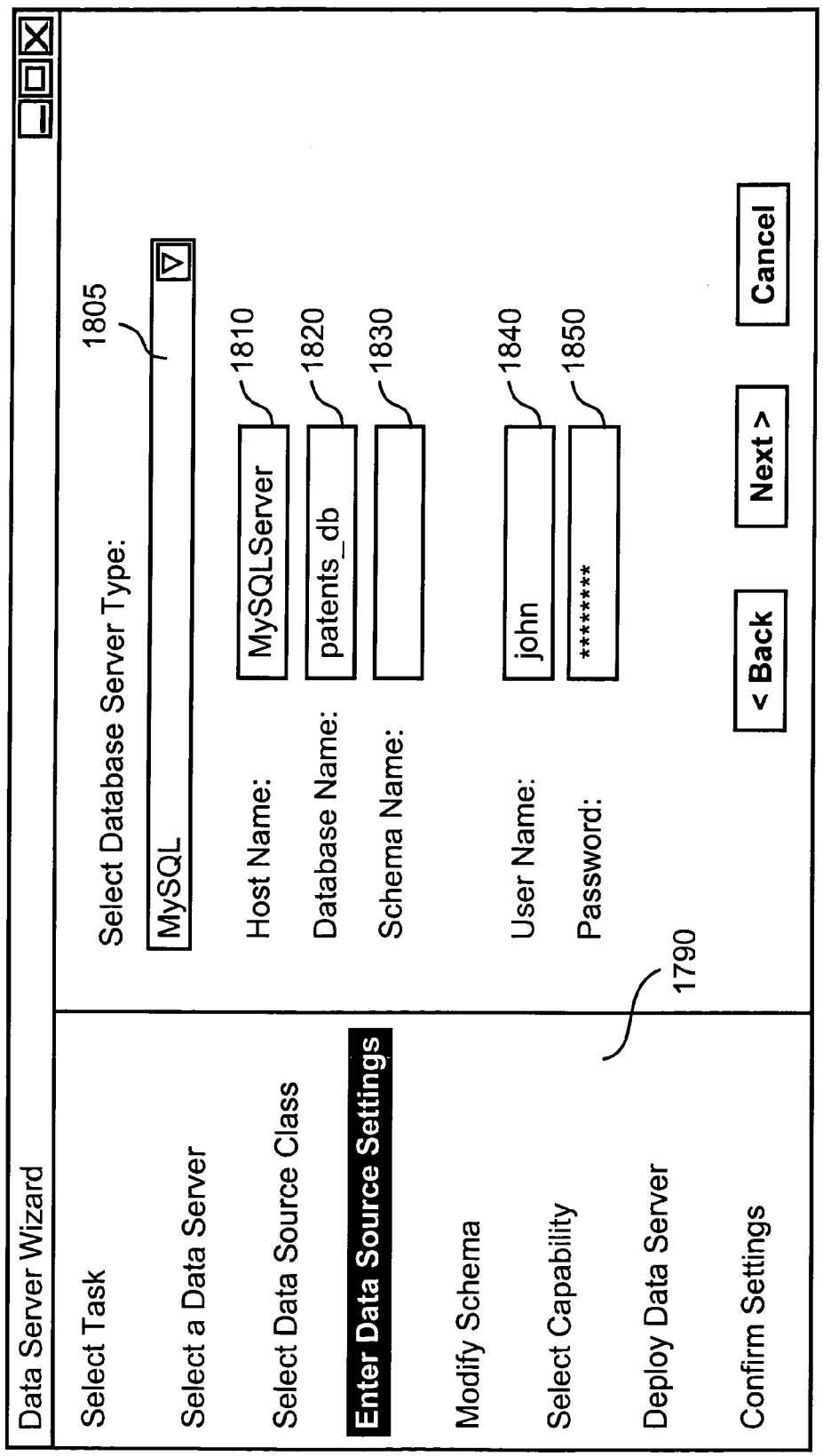
FIG. 18 is an illustration of the data server wizard window for entering the details of a relational data source for which a data server is to be generated.

Depending on the type of data source selected, the data server wizard 105 will prompt the user for further information. FIG. 18 shows the window of the data server wizard 105 prompting the user to enter the relational database details after the relational data source type is selected. In this example, the user selects the type of relational database from a list in control 1805, the name of the computer hosting this database in control 1810, and the name of the database in control 1820. For some relational database types (e.g., Oracle 9i), it is also necessary to specify the schema name for the desired database in control 1830. In order to access the data source for the purpose of constructing the data server 110, the user also specifies a user name and password in controls 1840 and 1850. The wizard will only be able to access data from the data source that is available to this user.

The data server wizard 105 requires different information to be entered for the different data source types. For example, some data source types may require a user name and password, others may not. The types of data sources supported by the preferred embodiment and the corresponding further information required to be collected by the data server wizard 105 are listed below.

(i) For a relational database, the database server hostname and the database name are required. In some instances, this may simply be a data source name that identifies a database such as an ODBC data source name. In addition, where the database is protected, user authentication details for accessing the database will also be required.

(ii) For a messaging server, such as Microsoft® Exchange Server™; the server hostname and the user authentication details for accessing the Exchange Server™ are required.

(iii) For a local mailbox of a mail client, such as Microsoft® Outlook Express™ or Netscape™, manufactured by Netscape Communications Corporation, the type of mail client is required.

(iv) For a semi-structured data source, such as directory hierarchies of files, a list of the directory pathnames is required.

(v) For a text file, such as a delimited text file, the pathname of the file and the details of the delimiters are required.

(vi) For a native XML database that supports the XML:DB API, such as Xindice, the URI of the database collection is required.

(vii) For Lotus Domino™; the Domino server name, the Lotus database name and the user authentication details for access the database are required.

It should be clear that other data source types could also be supported without departing from the scope of this invention.

At step 210, using the native schema information if available, or otherwise the data of the data source, the data server wizard 105 then generates a default XML Schema that represents the selected data source in the common data model. Step 210 is described in more detail later with reference to FIG. 3. The details of allowing multiple possible mappings from the native schema to the default XML Schema are also described later with reference to FIG. 3.

Figure 19:
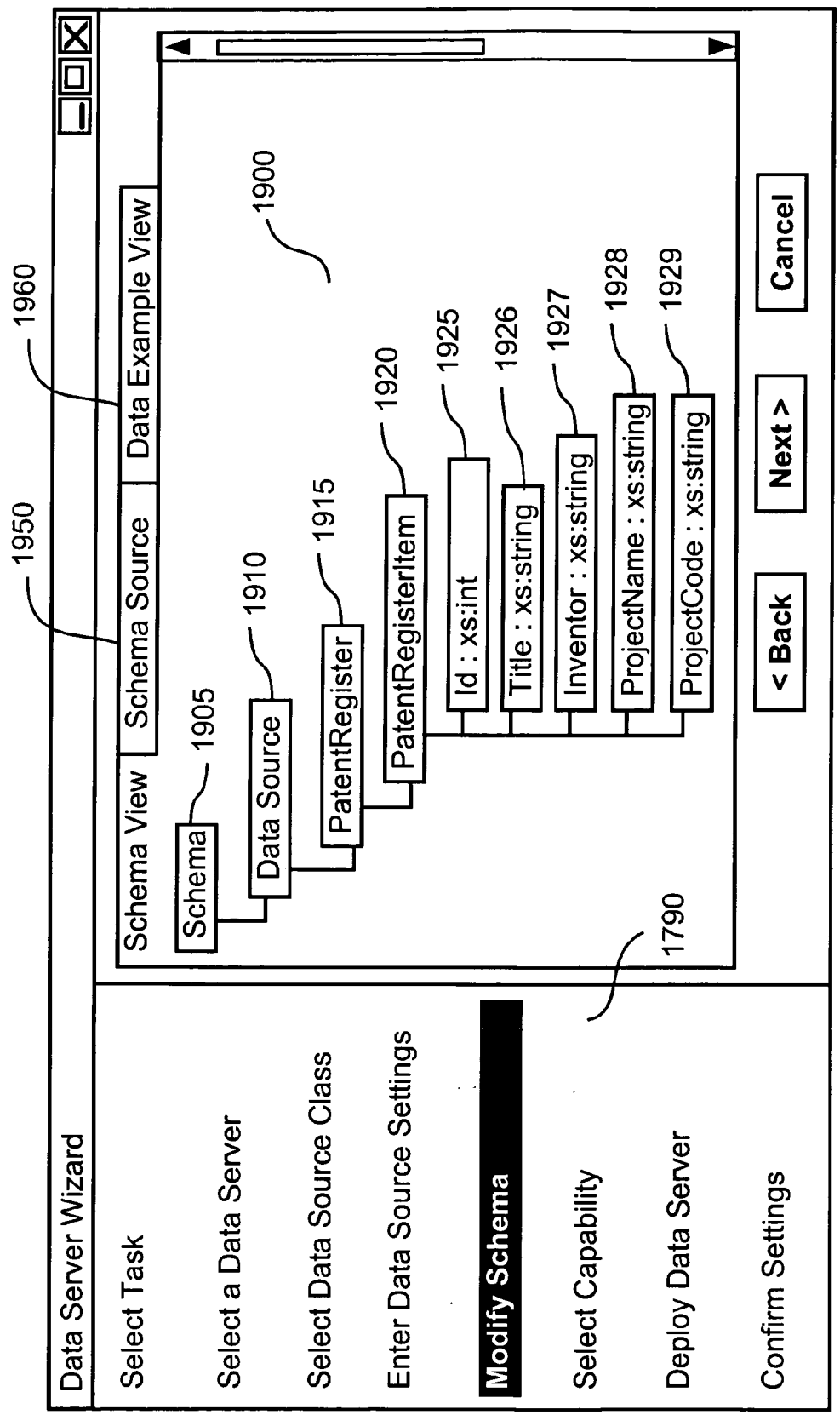
FIG. 19 is an illustration of the data server wizard window for displaying and modifying the generated default XML Schema.

At step 215, the data server wizard 105 transmits a display of the generated default XML Schema to the user in a graphical view via the display 1514. An example of this display is illustrated in FIG. 19. The schema 1900 is displayed as a tree of elements (1905, 1910, 1915, 1920, 1925, 1926, 1927, 1928, and 1929) and attributes (not shown in FIG. 19). As previously mentioned, the default schema is represented using the XML Schema language. The XML Schema source can be viewed by selecting tab 1950 in FIG. 19. In XML Schema, it is possible to define a type on which elements are to be based. A complex type is a type which can contain other elements and attributes. A simple type is one where the element's content is represented using a simple data type. For example, elements 1905, 1910, 1915 and 1920 are complex type elements because their content comprises other elements (and attributes which are not shown in FIG. 19). However, elements 1925, 1926, 1927, 1928 and 1929 are simple type elements because their content can be described by a simple datatype (e.g., xs: int or xs: string in FIG. 19). The prefix "xs" is used to specify names from the XML Schema namespace.

The user can also select to view some example data retrieved from the selected data source displayed using the generated XML Schema. This is achieved by the user selecting tab 1960 in FIG. 19 of the data server wizard 105. The data is displayed in a tree format for the user to check.

The user may modify the generated default XML Schema interactively. Preferably, context menus containing the commands for modifying the default XML Schema are provided and accessible from the graphical view of the default XML Schema in the data server wizard 105 window as shown in FIG. 19. The types of modification include, but are not limited to:

(i) renaming an element or attribute;
(ii) changing an element to an attribute and vice versa;
(iii) excluding an element or a sub-tree of elements;
(iv) creating a new complex type element (existing elements maybe repositioned to be the children of this new element);
(v) creating a new simple type element (the value of such an element may be derived from the value of an existing element or elements).

At step 220, the data server wizard 105 determines if changes to the generated default XML Schema are required by the user. If required, the data server wizard 105 allows the user, via the GUI represented on the display 1514, to make valid changes to the default XML Schema at step 225. If no changes are required, or once completed, operation of the data server wizard 105 proceeds to step 230.

Figure 20:
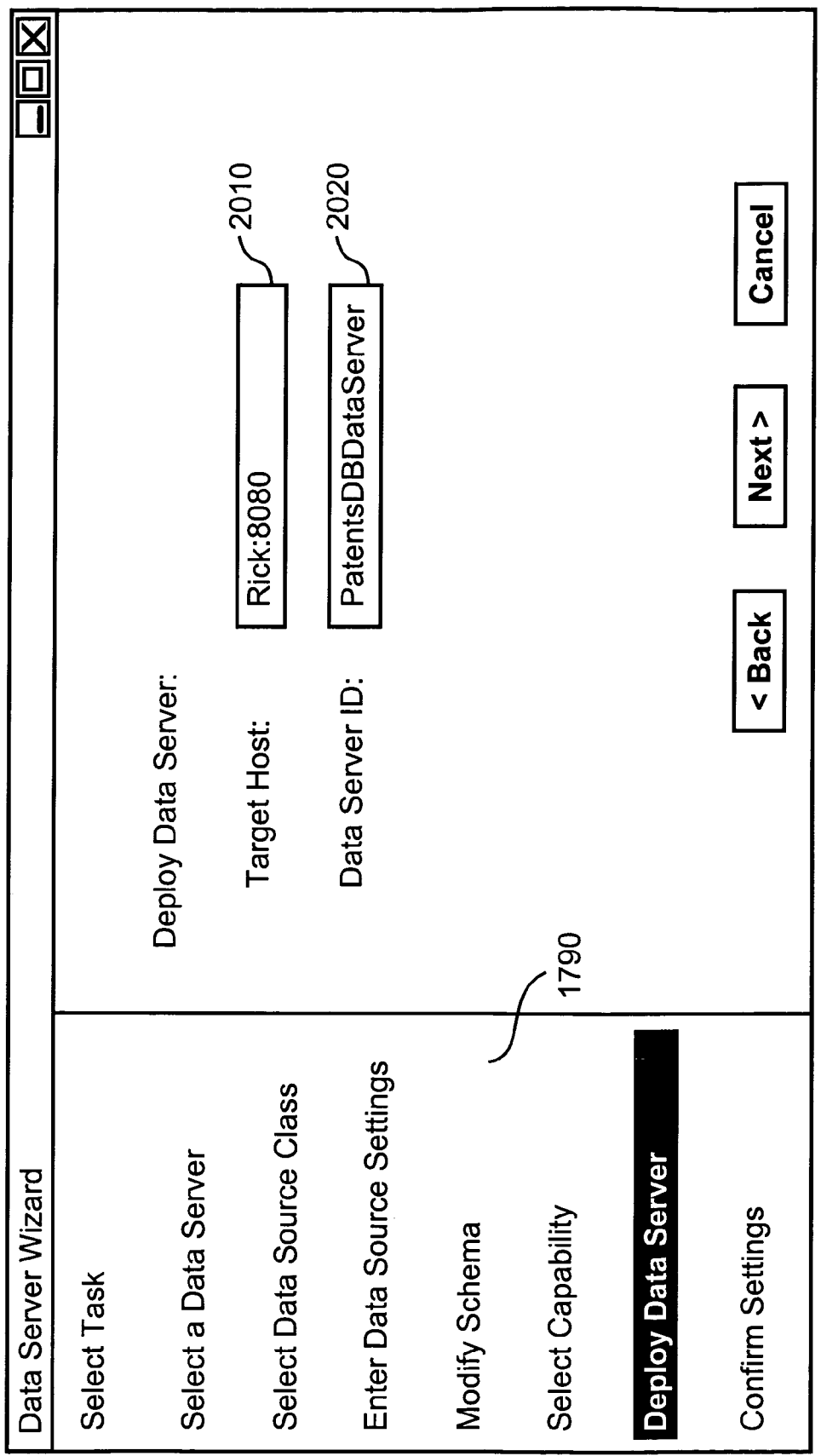
FIG. 20 is an illustration of the data server wizard window for entering the details for deploying the data server to be generated.
Figure 21:
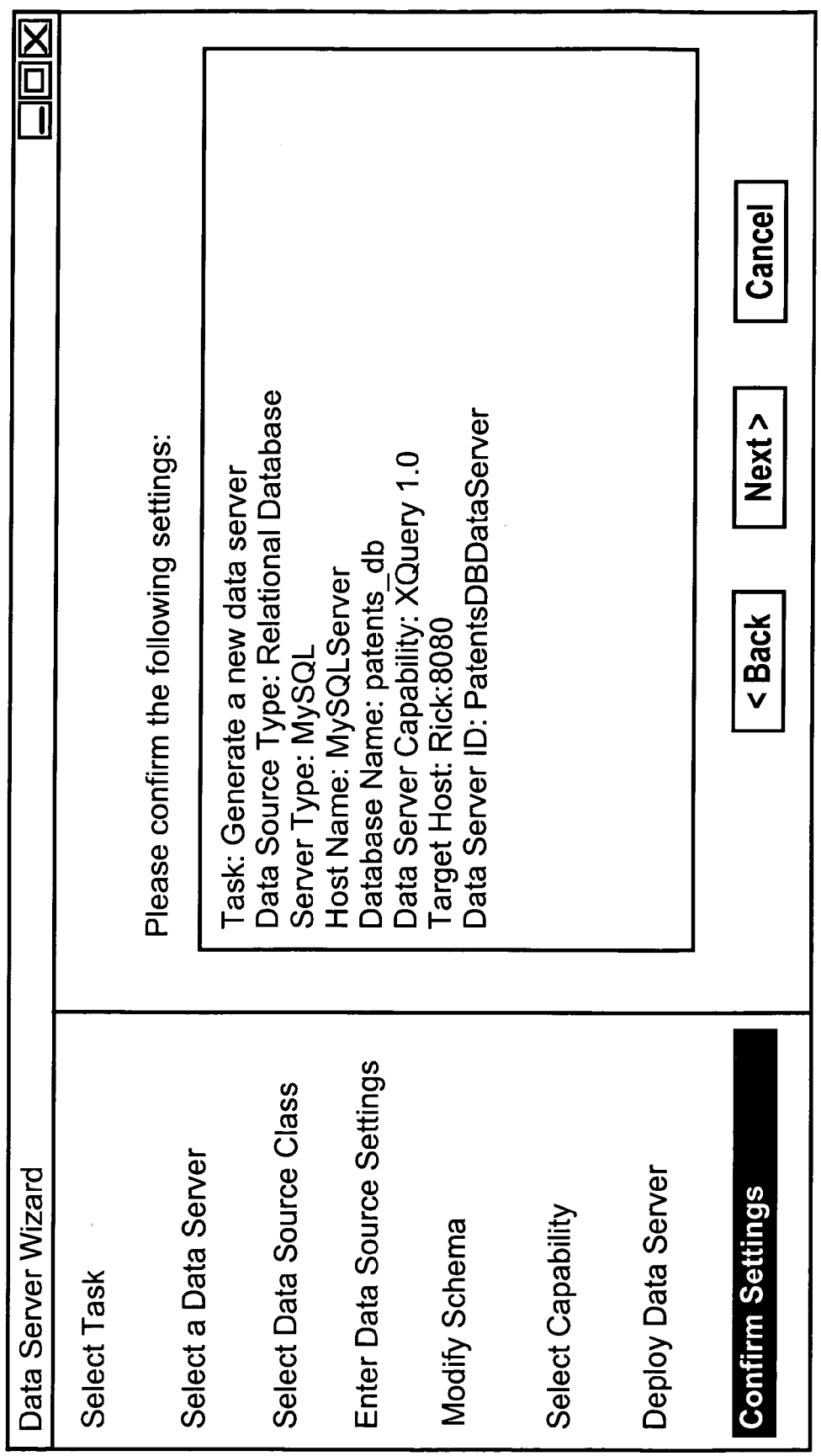
FIG. 21 is an illustration of the data server wizard window for displaying and confirming the details of the data server to be generated and deployed.

In step 230 the data server wizard 105 receives deployment details entered by the user 135. This step corresponds to the window shown in FIG. 20. Such details may include the name of the target host computer (eg. 1501) upon which the data server is to be deployed 2010, and an identifier of the deployed data server 2020. Once these establishing details are confirmed in the data server wizard 105 window as shown in FIG. 21, step 235 of the data server wizard 105 operates to generate and deploy the data server 110. Preferably, the data server is deployed as a servlet in the Apache Jakarta Tomcat servlet container. The deployment process is described in detail later in this description. The selected data source can now be accessed by the client application 130 via the deployed data server 110.

At any step in this method the user can select to go back a step using the button 1705, move to the next step using button 1710 or cancel the process of constructing and deploying a data server 110 using button 1715. Preferably, the data server wizard 105 can also save the specifications of a data server 110 to be constructed and the user can re-start the data server wizard 105 at a later stage to reload the specifications of the data server and deploy the specified data server. It should be clear that the steps involved in constructing and deploying a data server 110 could be operated by a user not practised in software engineering. A user can construct and deploy a data server without writing a computer program or any scripts. The user need have no knowledge of database query languages. Furthermore, it takes very little time to complete the steps (see FIG. 2) of the data server wizard 105. The data server wizard 105 thus assists a non-experienced user to enable a large number of heterogeneous data sources for integrated access using XML as the common data model.

A default XML Schema of a data source is generated in step 210. Annotation elements are added to the XML Schema to specify the mapping of elements and attributes to data from the data source.

Appendix A shows a simplified default XML Schema. The generated mapping information is stored in the XML annotation elements respectively found from lines 10-17, lines 41-48 and lines 55-62 of the XML Schema. The xs: annotation child element at lines 10-17 of the xs: schema element contains the mdbas:Settings and mdbas: MappingInfo elements (the prefix "mdbas" specifies names from a namespace which is defined for the data server wizard 105). This xs: annotation element is referred to as the global mapping information annotation element. The mdbas: Settings element contains data source specific child elements that hold the details of the data source, such as the database name. The mdbas:MappingInfo element also contains data source specific child elements that hold native schema information for mapping purposes.

All XML Schemas generated by the data server wizard 105 have a global element, DataSource, seen at lines 18-39. This element defines the root element of the data source. The DataSource element has descendant elements that contain data mapped from the data source. These descendant elements are of one of the global complex types, seen defined at lines 40-53 or lines 54-67 in the XML Schema of Appendix A. Each of these global complex types has an xs: annotation child element, seen at lines 41-48 or lines 55-62 respectively, that contains the mapping information of the elements defined in the complex type.

The method of generating a default XML Schema will now be described by way of an example. The example uses a relational Company database 700, seen in FIG. 7, as the data source. The database 700 has four tables, namely, Department 710, Project 715, ProjMember 720 and Employee 725. The primary key of each table is indicated by the key symbol 730. A department has zero or more projects. This relationship is established by the foreign key 735 of the Project table 715, which in this case is Dept ID, referencing the Department table. A project has zero or more employees as its members and an employee may be a member of zero or more projects. These relationships are established by the use of the join table ProjMember which has the foreign keys, Proj ID and EmpID, to the Project and Employee tables respectively.

Step 210 of generating a default XML Schema will now be described in more detail for the Company database 700 with reference to FIG. 3 and Appendix B. At step 305, the data server wizard 105 connects to the selected database (i.e. the Company database 700 depicted in FIG. 7) using the details of the data source obtained in step 205. At step 310, the data server wizard 105 retrieves the native schema information of the database. For a relational database, this includes the definitions of the tables, the columns in each table and the primary keys and foreign keys. At step 315, the data server wizard 105 creates a skeleton XML Schema with the xs: schema element and the appropriate namespace definitions. Step 315 then adds the global mapping information annotation element, seen at lines 10-64 of Appendix B, as a child to the xs: schema element. The mdbas:Settings element, seen at lines 12-19 within the global mapping information annotation element, contains child elements that hold the details of the selected database. The mdbas:MappingInfo element, seen at lines 20-62, contains child elements that hold the native schema information required for mapping data from the data source to elements in the default XML Schema. For a relational database, this information includes the tables and the relationship between the tables, as for example depicted in FIG. 7.

At step 320, the data server wizard 105 creates a global complex type for each table (710-725) in the database (700). Each complex type contains:
 (i) An element having an simple type for each column in the corresponding table,
 (ii) An element having an complex type for each table referenced by a foreign key in the corresponding table, and
 (iii) An element having an complex type for each table references the corresponding table.

For example, the Project complex type, seen at lines 222-292 in Appendix B, contains following the child elements:
 (i) Proj ID (lines 267-273), ProjName (lines 274-280) and DeptID (lines 281-287) for the fields in the Project table 715;
 (ii) Department (line 288) for the Department table 710 that the Project table 715 references using the foreign key DeptID 735; and
 (iii) ProjMember (line 289) for the ProjMember table 720 that references the Project table 715.

For each of the complex types created in step 320, the data server wizard 105 adds a child xs: annotation element to the complex type. This xs: annotation element contains a mdbas: MappingInfo element specifying the mapping from the data source for each child element of the complex type. For example, the xs: annotation element of the Project complex type (lines 222-292) contains the mapping information for each child element of the Project complex type. Using this mapping information in conjunction with the mapping information in the global mapping information annotation element seen at lines 10-64 of Appendix B, a data server 110 is able to retrieve data from the data source 115 required for processing an XQuery. The method used by the data server 110 to retrieve data will be described in more detail later.

Finally, a global element is created for the document element or root element of the data source at step 330. Here, the data server wizard 105 creates a global element DataSource, seen at lines 69-127. At step 335, a child element, such as at lines 72-84, and a grandchild element, such as at lines 75-81, are created for each table 710-725 in the database 700. The grandchild element has the corresponding complex type of the table and has an occurrence constraint of zero to unbounded. This maps each record in a table to an element instance. The child element acts as a container of the elements mapped from the same table.

Figure 3:
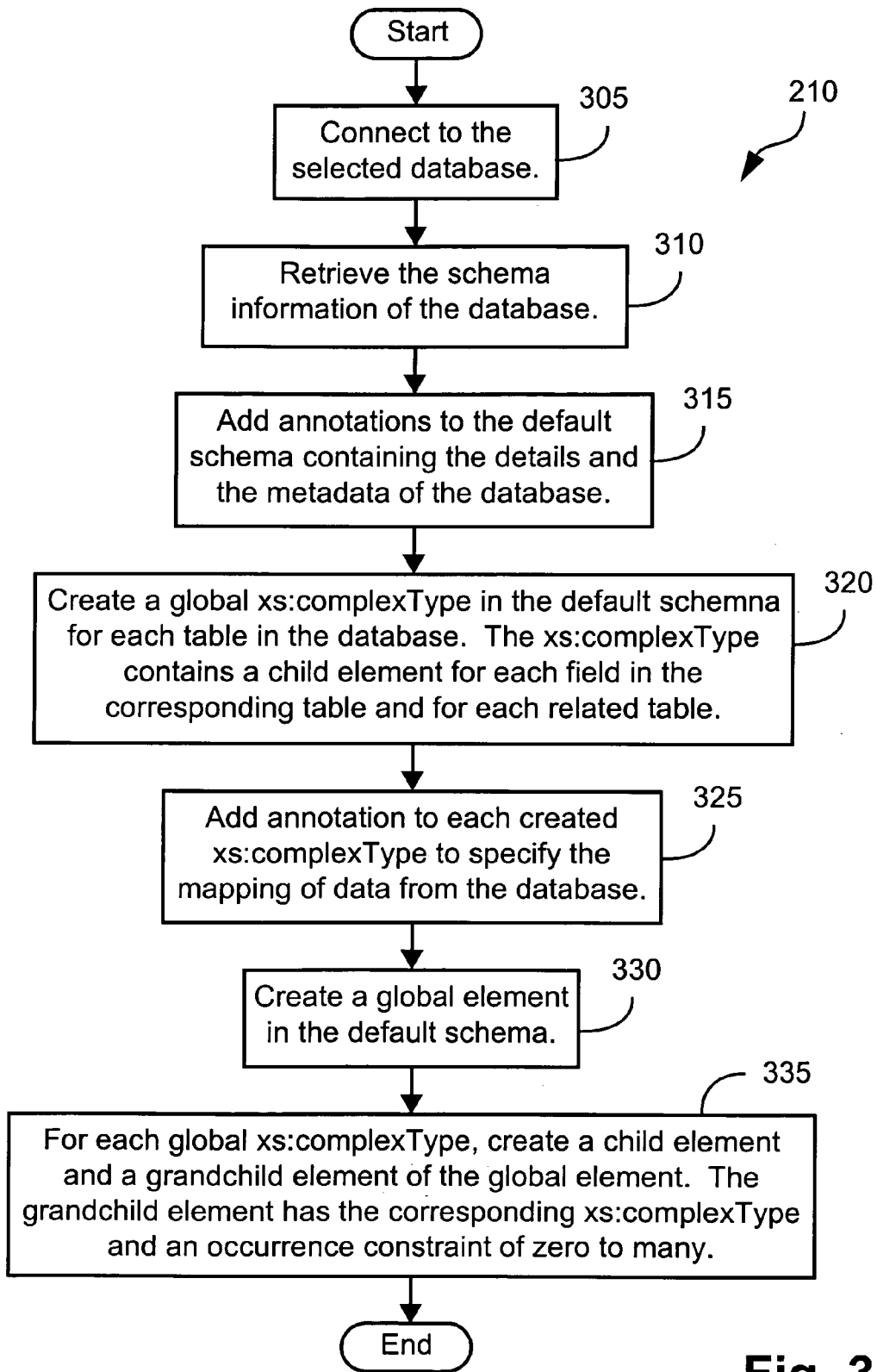
FIG. 3 is a flowchart showing the expanded details of a step in FIG. 2 for generating a default schema for a relational data source.
Figure 8:
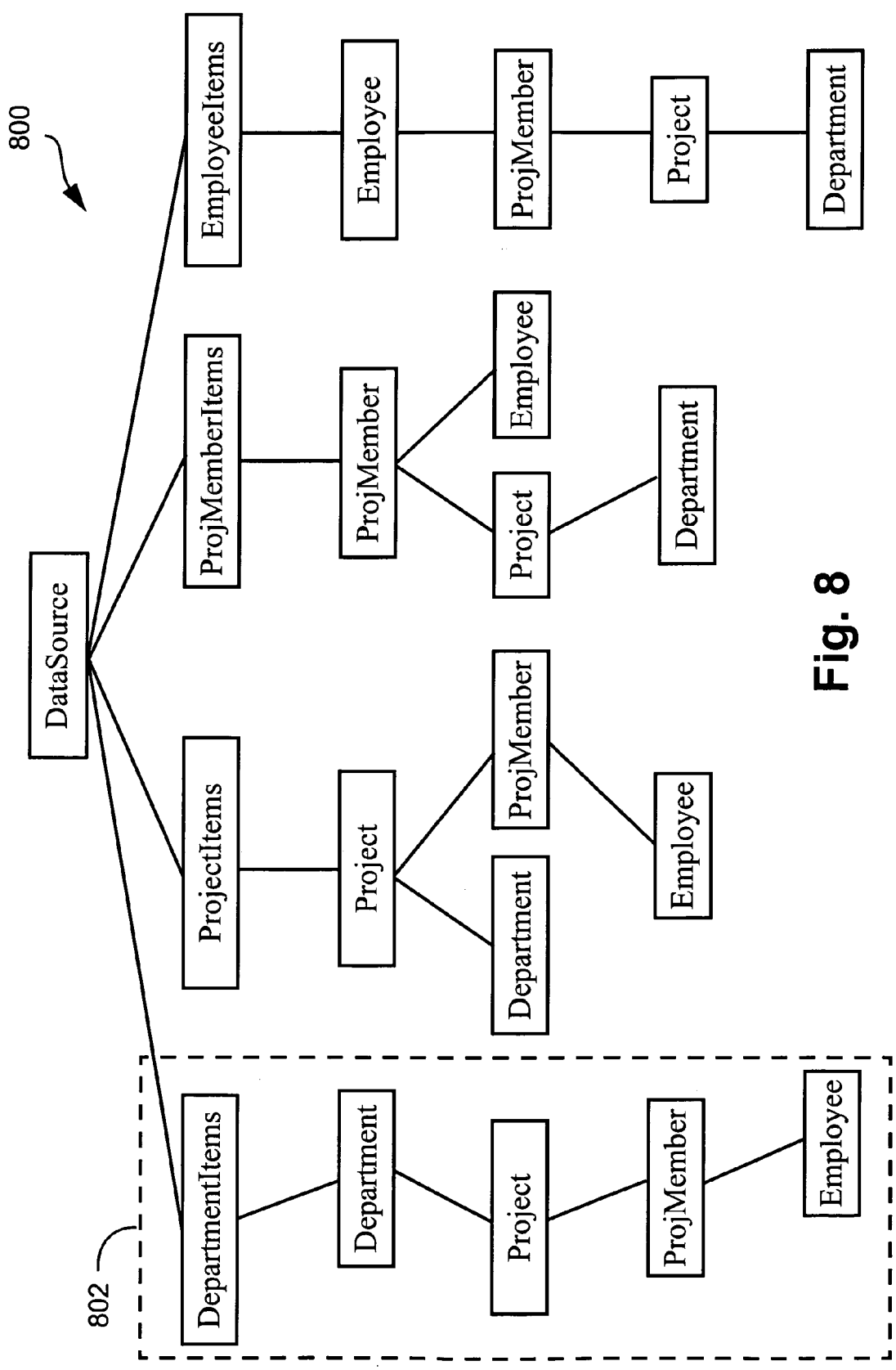
FIG. 8 is a graphical diagram showing the default XML Schema generated for the example Company database.

A default XML Schema generated using the method according to step 210 of FIG. 3 is able to provide multiple representations of the structure of a data source where multiple mappings are possible. FIG. 8 graphically illustrates the default XML Schema 800 generated for the Company database 700. The simple type elements, being the leaf nodes have been omitted for simplicity. Clearly, a tree structure is shown, and each sub-tree, starting at DepartmentItems, ProjectItems, ProjMemberItems and EmployeeItems, provides a different view of the data source by varying the parent-child relationships between the elements. An XQuery can be formulated to retrieve data from one of these sub-trees for a particular view of the data. For example, the expression /DataSource/ProjectItems in an XQuery will select the ProjectItems sub-tree which provides a view of the project data and other data related to each project in the data source.

The XML schema generated by the data server wizard 105 is used for two purposes. First, it is used by the data server 110 at runtime for processing a query. Second, it is used by a client application 130 for determining the structure of the data source 115 when formulating a query. In the latter case, preferably a version of the XML Schema without the mapping information annotations is made available to all client applications 130. This is desirable as the XML Schema used by the client application 130 does not need the mapping information. In another implementation, the mapping information annotated in the XML Schema can be stored separately from the generated XML Schema.

In addition to generating a default XML Schema (and optionally modifying that schema) for representing the structure of a data source in the common data model, a further feature of the preferred embodiment allows a predefined XML schema to be used for a data server. As the XML Schema Recommendation is increasingly being used to define the syntax of information for exchange, it is desirable to be able to incorporate information from a legacy data source according to the syntax defined by a predefined XML Schema. This means that the structure of the data stored in the data source does not need to be changed.

Figure 4:
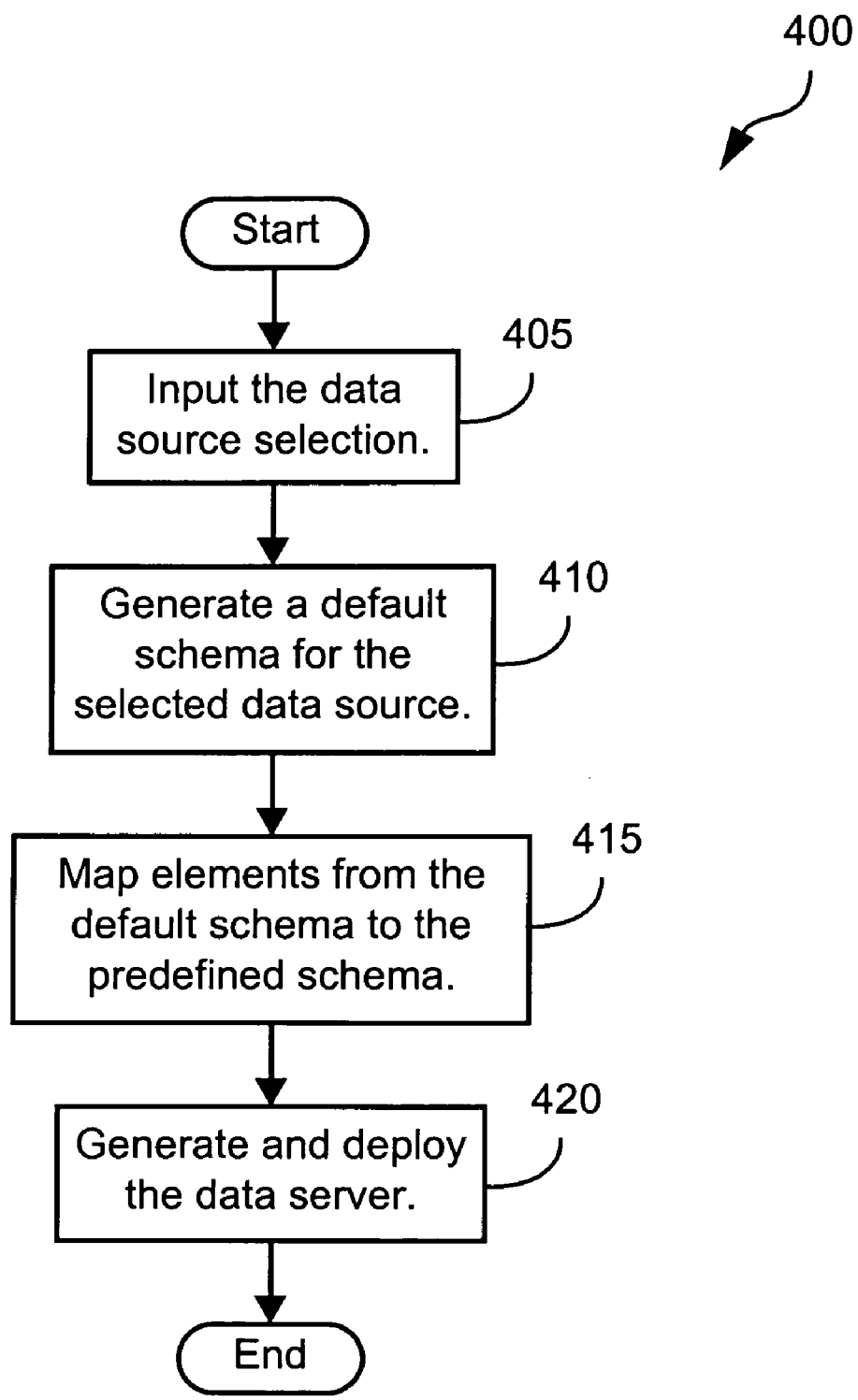
FIG. 4 is a flowchart of a method for generating a data server having a predefined schema.

A method 400 of generating a data server 110 having a predefined schema will now be described with reference to FIG. 4. The method 400 is implemented by the data server wizard 105 and steps 405 and 410 are the same respectively as steps 205 and 210 described previously. At step 415, the data server wizard 105 allows the user to interactively map elements from the generated default XML Schema to the predefined XML Schema. This step will be described in more detail below with reference to FIG. 5. At step 420, the data server wizard 105 generates and deploys the data server 110 substantially as described for step 235, however in this instance the data server 110 will use the predefined XML Schema rather than the generated default schema.

Figure 5:
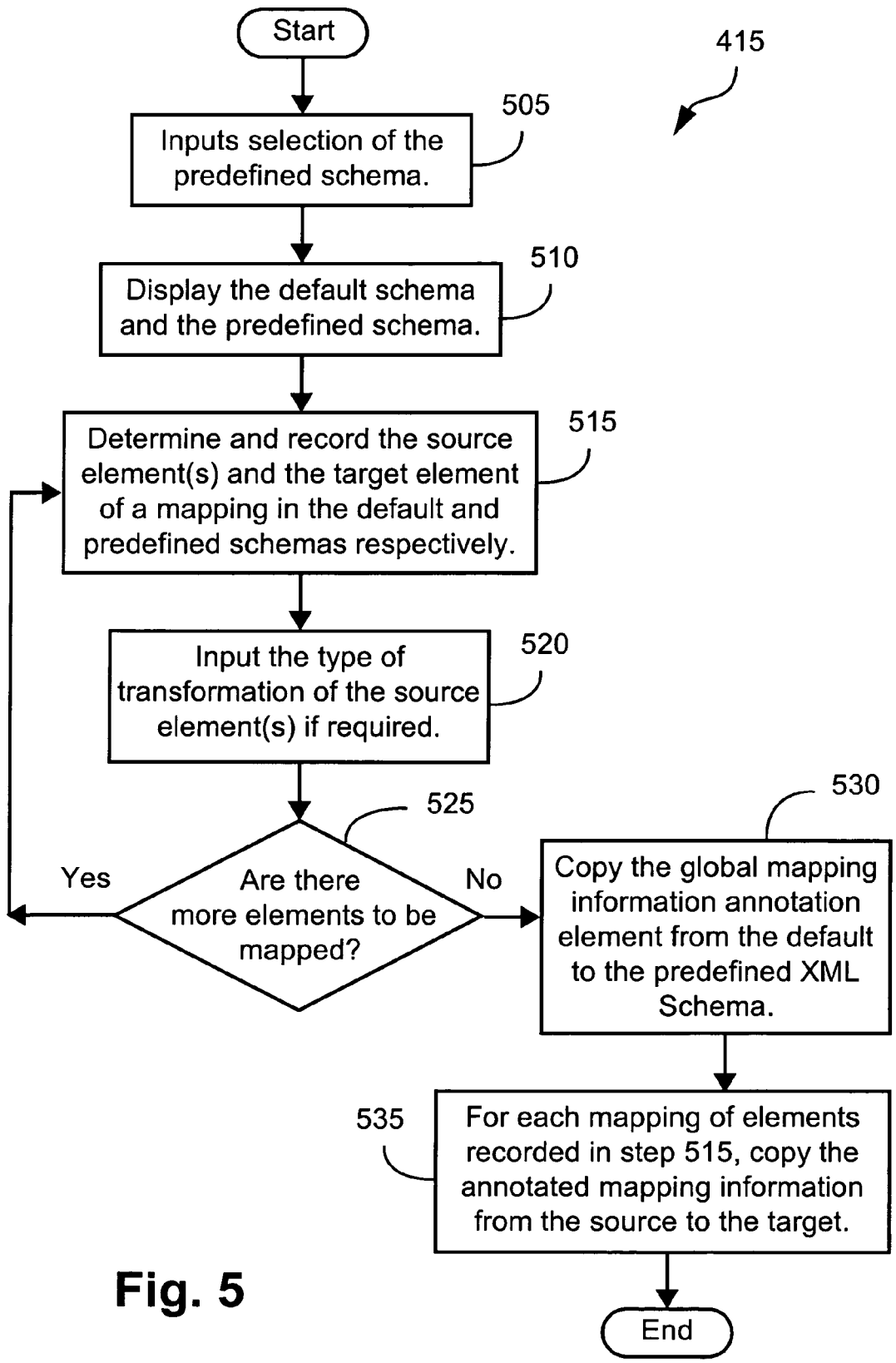
FIG. 5 is a flowchart showing the expanded details of a step in FIG. 4 for mapping a default schema to a predefined schema.
Figure 6:
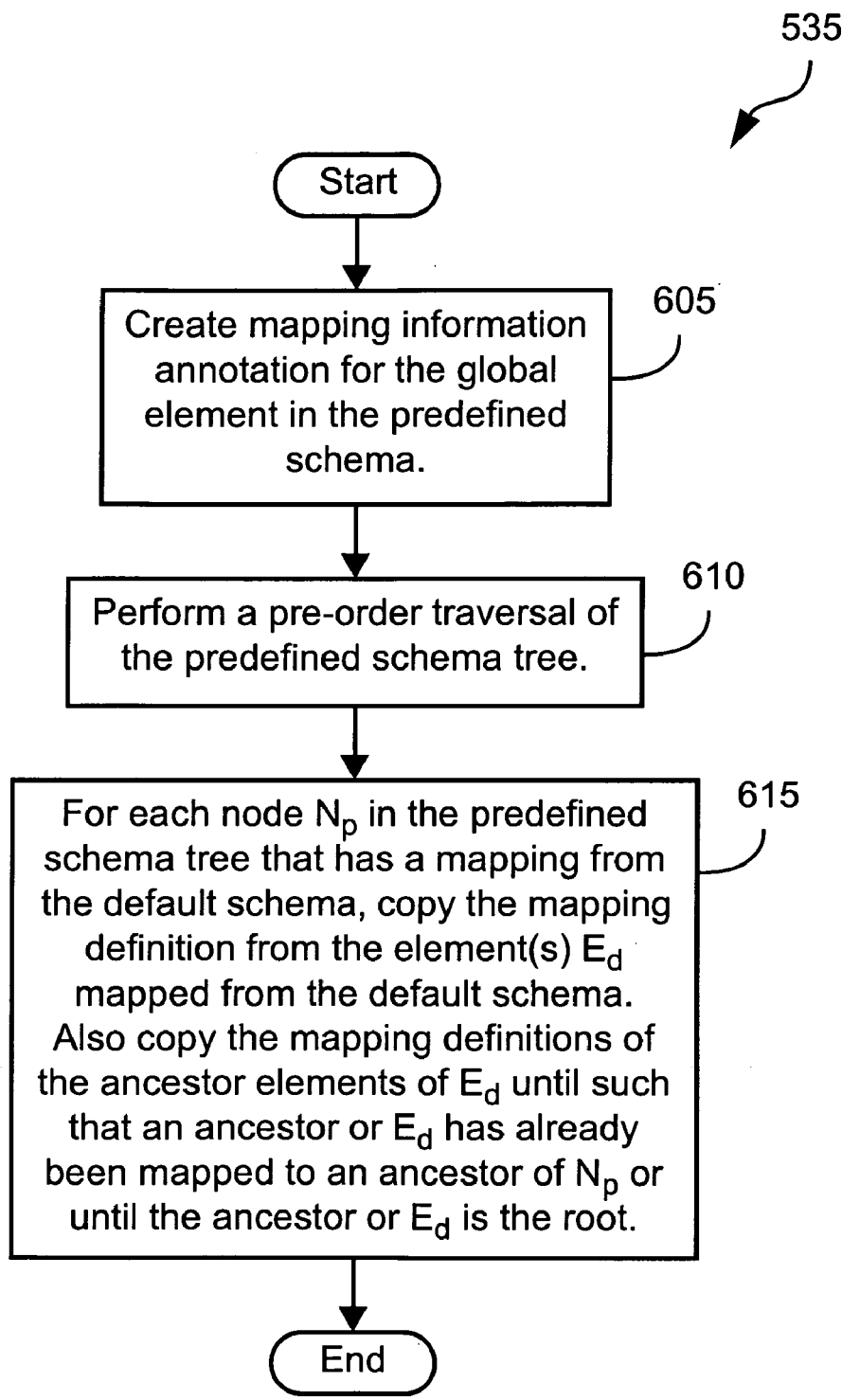
FIG. 6 is a flowchart of a method for copying the mapping information from the default schema to the predefined schema for the mapped elements.

The method of step 415 of mapping a generated default XML Schema to a predefined schema will now be described with reference to FIG. 5. At step 505, the user specifies the predefined XML Schema in the data server wizard 105. This may be done by the user 130 typing via the keyboard 1502 the path of the predefined XML Schema file or using a file dialog via the GUI. At step 510, the data server wizard 105 transmits for display to the user via the GUI both the generated default XML Schema 1405 and the predefined XML Schema 1410. These are displayed side-by-side graphically as shown in FIG. 14. At step 515, the user is allowed to interactively specify the mapping from one or more elements or attributes in the default XML Schema to an element or attribute in the predefined XML Schema. One manner in which this may be accomplished is for the user to perform a drag-and-drop operation upon a graphical user interface (GUI), such as that shown in FIG. 14 and operated by the data server wizard 105. In such an operation, one or more graphical objects representing the source elements 1415 in the default XML Schema may be selected, using a click-hold of the mouse 1503, dragged and then dropped (click-release of the mouse 1503) onto a graphical object representing the target element 1420 or attribute in the predefined XML Schema in the GUI. This mapping of the elements, is recorded by the data server wizard 105.

After specifying a mapping, the user may define a transformation of the data to be mapped in step 520. This transformation allows a value to be formatted or multiple values to be combined according to one or more specified transformation functions. The types of function may comprise, but are not limited to:

(i) format functions, such as number format, currency format;
(ii) string functions, such as concatenation, substring, capitalisation;
(iii) arithmetic operations;
(iv) aggregate functions, such as sum, count, maximum, minimum and average.

At step 525, the user can continue to specify more mappings. When finished, the method 415, being part of the data server wizard 105 proceeds, to step 530 where the global mapping information annotation element lines 10-64 are copied from the default to the predefined XML Schema.

At step 535, the data server wizard 105 copies the annotated mapping information from the default to the predefined XML Schema for each mapped elements recorded in step 515. Step 535 will now be described with reference to FIG. 6. At step 605, the data server wizard 105 creates a child annotation element for the global element of the predefined XML Schema. A pre-order traversal of the predefined XML Schema tree is then commenced at step 610. At step 615, for each traversed node $N_p$ (element or attribute) that has a mapping from the default XML Schema, the data server wizard 105 copies the following information to the corresponding mdbas: MappingInfo node of $N_p$ in the predefined XML Schema:

(i) the mapping definition, being the mdbas: mapping element of the mapped element $E_d$ from the default XML Schema; and
(ii) the mapping definitions of each ancestor element of $E_d$ until such that an ancestor of $E_d$ has already been mapped to an ancestor of $N_p$ or until the ancestor of $E_d$ is the root element.

The mapping of the default XML Schema to the predefined schema is complete when each node in the predefined schema tree has been traversed and the required mapping definitions have been copied.

Figure 9:
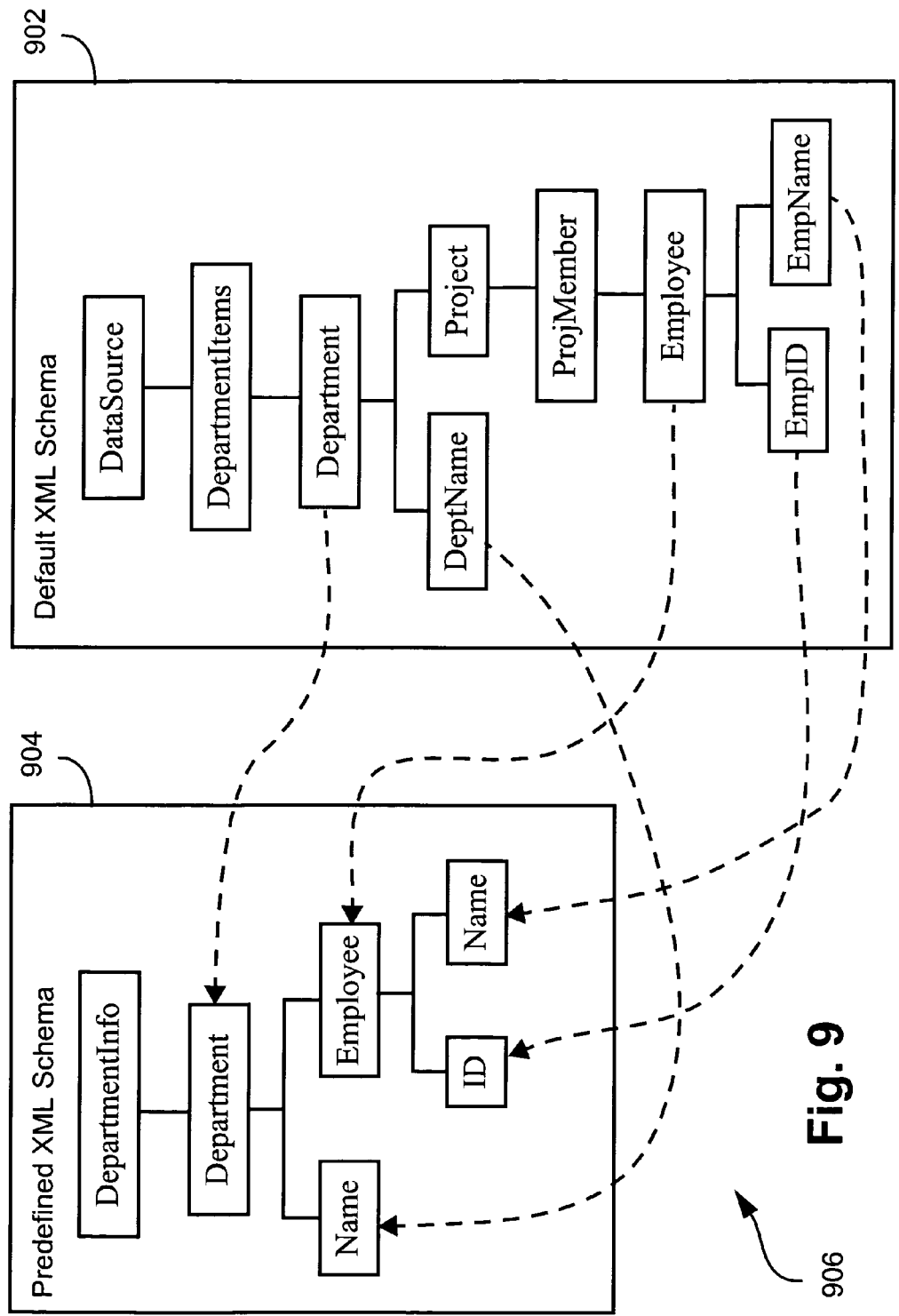
FIG. 9 shows the required mapping from the default XML Schema of the example Company database to the example predefined XML Schema.

The method of mapping the default XML Schema to the predefined XML Schema in step 415 (illustrated in detail in FIGS. 5 and 6) will now be illustrated with an example. Appendix C shows a predefined XML Schema for which the user wishes to generate a data server from the Company database. Appendix B shows the default XML Schema of the Company database. FIG. 9 shows the required mapping 906 between the default XML Schema 902, being substantially the branch 802 of the schema tree 800 of FIG. 8, and the predefined XML Schema 904, and it is noted that only the relevant section of the default XML Schema 902 is shown in FIG. 9. Unlike FIG. 8, FIG. 9 also illustrates the simple type elements.

Appendix D shows the predefined XML Schema 904 annotated with mapping information after performing the mapping in step 415. Note the following sections of Appendix D.

(i) Lines 5-59 define global mapping information annotation element copied from the default XML Schema 902 according to step 530.

(ii) Lines 65-116 represent the element mapping information copied from the default XML Schema 902 according steps 605-615.

(iii) Lines 69-71 provide the mapping definition of the Department element copied from the mapping definition of the Department element of lines 133-135 of Appendix B in the default XML Schema 902 according to step 615.

(iv) Lines 74-77 provide the mapping definition of the Name element copied from the mapping definition of the DeptName element of lines 145-148 of Appendix B in the default XML Schema 902 according to step 615.

(v) Lines 81-83 provide the mapping definition of the Employee element copied from the mapping definition of the Employee element of lines 183-185 of Appendix B in the default XML Schema 902 according to step 615.

(vi) Lines 84-98 is the mapping definitions of the Employee element copied from the mapping definition of the ancestor elements of Employee from Appendix B at lines 202-204, lines 298-300, lines 323-325, lines 227-229 and lines 223-225 in the default XML Schema 902 according to step 615. The mapping definition of the ancestor element Department is not copied because it is already copied to the parent of the Employee element in the predefined XML Schema 904 according to step 615.

(vii) Lines 101-104 is the mapping definition of the ID element copied from the mapping definition of the EmpID element at lines 188-191 of Appendix B in the default XML Schema 902 according to step 615.

(viii) Lines 108-111 is the mapping definition of the Name element copied from the mapping definition of the EmpName element at lines 195-198 of Appendix B in the default XML Schema 902 according to step 615.

The above example illustrates the mapping 906 of a Predefined XML Schema 904 from the data server wizard 105 generated default XML Schema 902. This predefined XML Schema 904 with the mapping information 906 can now be deployed with a data server 110 to enable the Company database to be accessed based on the predefined XML Schema 904.

Instead of specifying the mappings 906 between the default XML Schema 902 and the predefined XML Schema 904, an alternative implementation can be used. In this alternative implementation, a transformation XQuery is used to transform the default view of the data server 110 (as specified by the default XML Schema) to a view of data that is specified by the predefined (desired) XML Schema. Therefore, instead of storing mappings 906 in the predefined XML Schema as described above, the user can provide an appropriate transformation XQuery. The transformation XQuery could be entered by the user using the keyboard 1502 or provided as a text file which is accessed by the data server wizard 105.

Using the same example in FIG. 9, the following transformation XQuery will produce a view of data consistent with the predefined XML Schema:

```
<DepartmentInfo>
{
    for $i in /DataSource/DepartmentItems/Department
    return
        <Department>
        {
            <Name>
            {
                $i/DeptName/text( )
            }
            </Name>
        }
        {
            for $j in $i/Project/ProjMember/Employee
            return
                <Employee>
                {
                    <ID>
                    {
                        $j/EmpID/text( )
                    }
                    </ID>
                }
                {
                    <Name>
                    {
                        $j/EmpName/text( )
                    }
                    </Name>
                }
                </Employee>
        }
        </Department>
}
</DepartmentInfo>
```

In this implementation, a data server 110 transforms the data from the data source 115 using the user specified transformation XQuery and the result is used as the default view.

A further implementation for enabling a predefined XML Schema to be used by a data server 110 to represent the data in the data source 115 will now be described. It is a combination of the two implementations described previously. The mappings of elements and attributes from the default XML Schema to the predefined XML Schema performed by the user using the wizard 105 as described in steps 505 to 525 of the first implementation is also used in this implementation. Instead of copying the corresponding mapping information from the default XML Schema to the predefined XML Schema, the mappings recorded are used to generate a transformation XQuery for transforming the data from the default view of the data (as specified by the default XML Schema) to the desired view of data (as specified by the predefined XML Schema). The transformation XQuery is then used as described for the second implementation.

The data server wizard 105 generates and deploys a network-addressable data server which enables the data source to be accessed across a network. In a preferred implementation, this data server 110 is a server-side web application preferably implemented as a Java servlet. The data server 110 is a server-side program hosted by an application server, such as Tomcat manufactured by Apache Software Foundation. A client can send a request to a servlet and receive a response using a communication protocol such as HTTP. This server application is addressable by a Uniform Resource Identifier (URI). Since the data server 110 represents the data source using XML Schema, it is possible for a client application 130 to provide integrated access to a plurality of data servers. For example, a client application 130 can process individual queries which obtain data from more than one data source via data servers 110.

The client application 130 can either use the HTTP get or post protocols to access deployed data servers. If the get protocol is used the XQuery is included as a parameter in the URI. For example, the URI, http://www.abc.com/DeptDS?xquery=/DepartmentInfo/Department can be used to access data from a data server named DeptDS on the network host identified by http://www.abc.com using the provided XQuery expression.

Preferably, XQuery expressions are appropriately encoded for transport within URIs. If the post protocol is used, then the XQuery expression can be transported within the body of an HTTP request.

Preferably, data servers for sensitive data sources are accessed using Secure Socket Layer (SSL) over HTTP (commonly referred to as HTTPS). Requests to the data servers preferably also contain authentication tokens, such as username and password. The data server then uses the provided authentication tokens to access the data source. The type of authentication token depends on the type of data source. For example, relational databases typically require a user name and password before a connection to the database is provided. Authentication tokens are provided to the data server as additional parameters either encoded in the URI or transported in the body or header of the HTTPS request.

The preferred implementation also allows the user to create and deploy a data server 110 for a data source 115 using a default authentication token. This means that a client application 130 can access the data server over HTTP without including an authentication token. The default authentication token is stored in the mdbas: Settings element of the default XML Schema. Appendix B shows an example of a default XML Schema which contains a rm:DefaultUserName and a rm:DefaultPassword element (lines 17 and 18, respectively) to be used for all queries directed to the data server.

Figure 10:
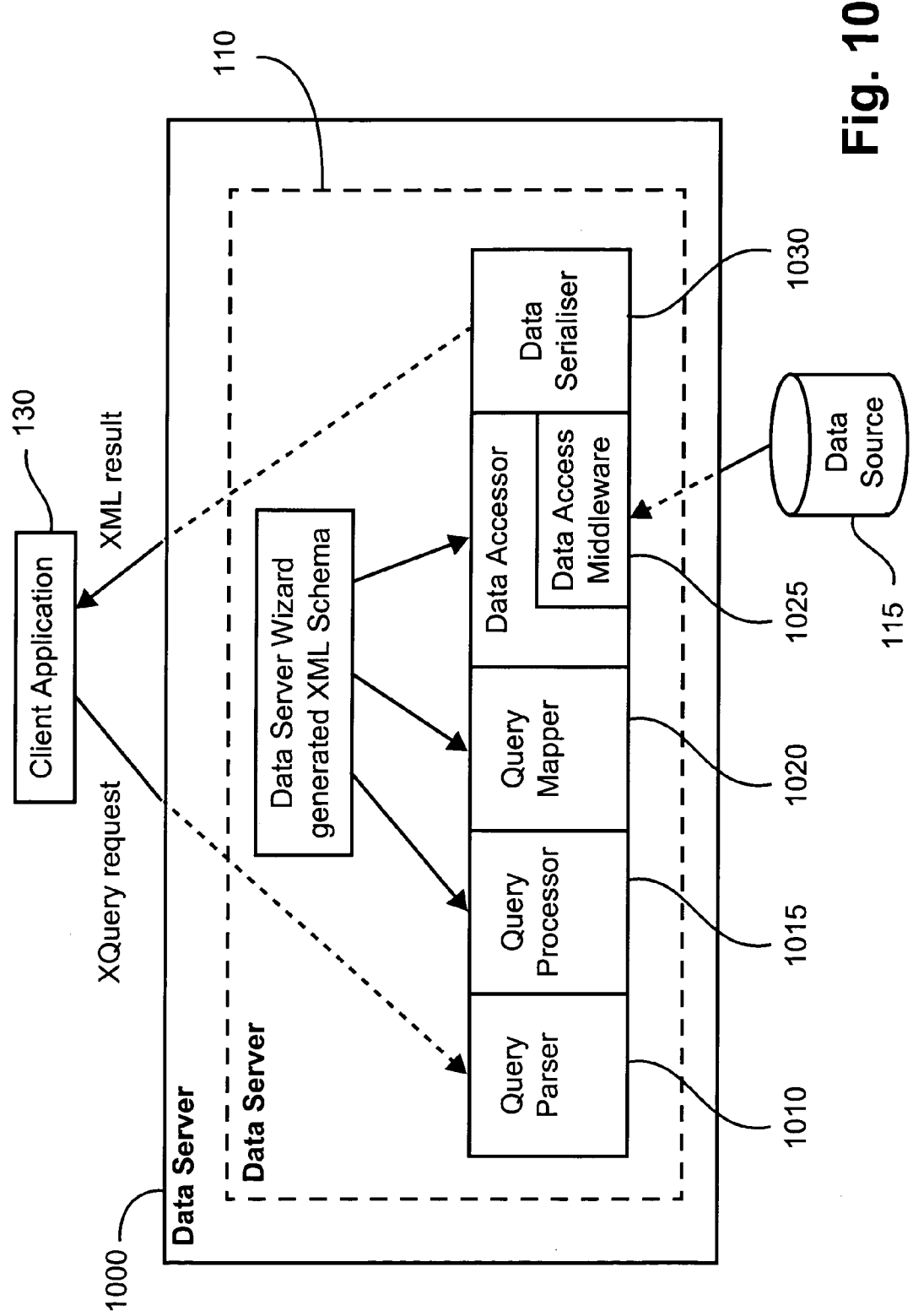
FIG. 10 shows the architecture of the Data Server.

FIG. 10 shows the architecture of the data server 110, which is typically hosted within an HTTP server 1000. Information in the XML Schema 1005 generated by the data server wizard 105 is used at runtime by various components of the data server 110 when processing an incoming query from a client application. The components include a:

(i) Query parser 1010, which parses an incoming query string into a suitable structure for processing;
(ii) Query processor 1015, which analyses and processes an incoming query;
(iii) Query mapper 1020, which uses the mapping information in the XML Schema to mapping an incoming query to one or more native queries or API calls;
(iv) Data accessor 1025, which retrieves data from the data source by issuing mapped native queries using the appropriate data access middleware such as ODBC or other APIs; and
(v) Data serialiser 1030, which converts the retrieved data into XML.

Preferably, the above components are implemented as Java classes and comprise the functionality of a data server. The query parser 1010, query processor 1015 and data serialiser 1030 are common to all data servers 110. The query mapper 1020 and data accessor 1025 are specialised for each type of data source. When the data server wizard 105 generates a data server 110, it packages the common and the specialised components corresponding to the type of data source together with the XML Schema 1005 into a web archive file (.war). Preferably, the data server wizard 105 then deploys the data server 110 as a servlet in the Tomcat (Apache Software Foundation) servlet container by uploading and installing the web archive file using the Tomcat Manager's deployment function. Once deployed in this way, the data server is ready to process query requests. Clearly, the data server could also be deployed as a service accessible over HTTP using other web server environments.

Figure 11:
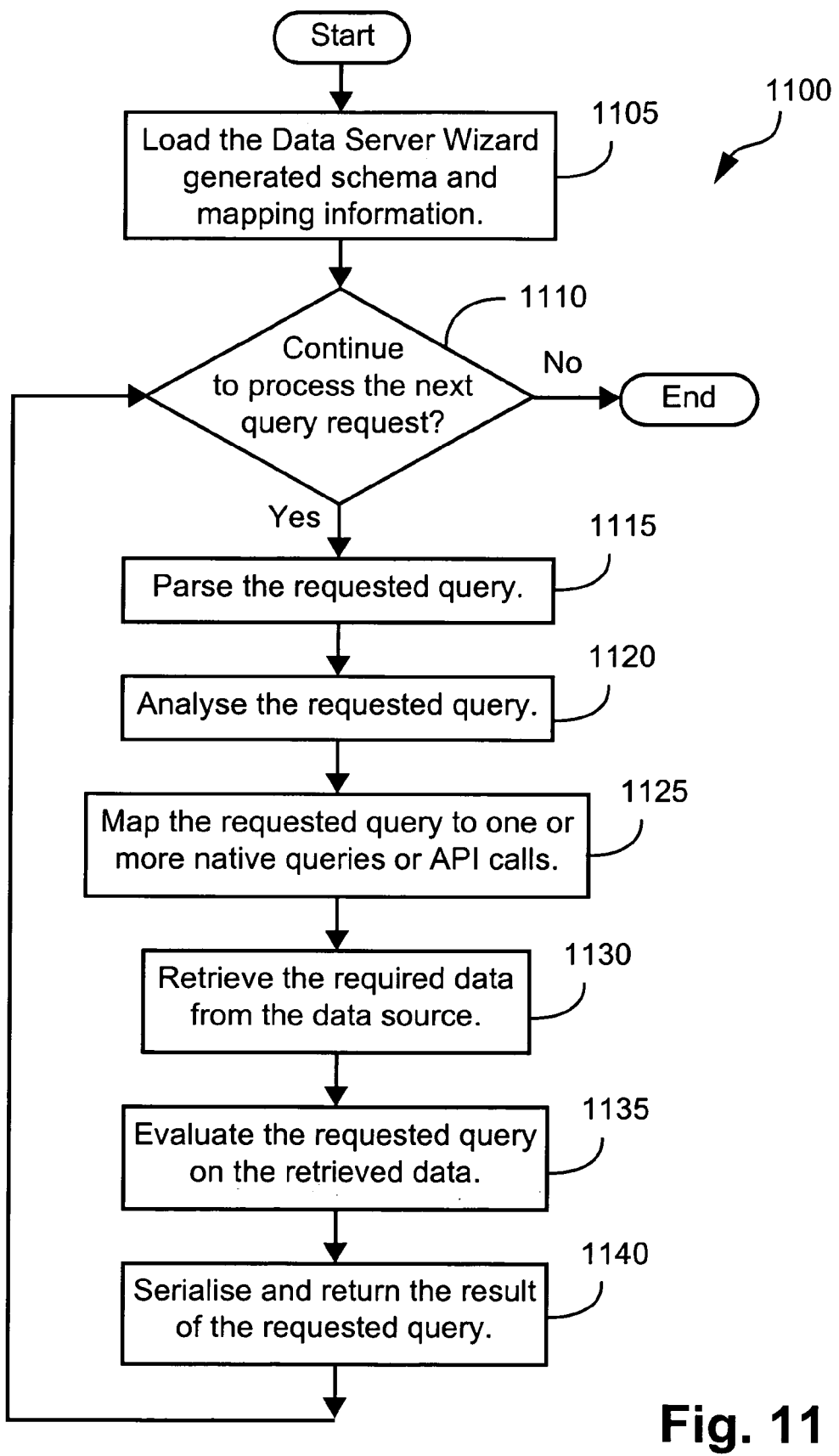
FIG. 11 is a flowchart of a method for processing incoming queries from a client by the data server.

A method 1100 of processing a query request sent to a data server 110 by a client application 130 is shown in FIG. 11. This method 1100 is implemented by the various components of the data server 110 shown in FIG. 10.

Step 1105 is an initialisation step which is performed when the data server 110 is started. At step 1105, the data server 110 loads the generated XML Schema and the associated mapping information into a schema tree for use when processing a query. This schema tree is a tree structure of the schema similar to the tree 800 shown in FIG. 8, except with the mapping information (being leaf nodes) attached to the corresponding nodes. When mapping an incoming query to native queries of the data source 115, this schema tree is traversed to obtain the required mapping information.

The data server 110 then enters a loop at step 1110 to process incoming queries in turn. At step 1115, the query parser component 1010 of the data server 110 parses an incoming query into a query structure for processing. The processing starts at step 1120 which involves analysing the query and devising an execution plan by the query processor 1015. The detail of step 1120 is known in the art relating of XQuery processing.

At step 1125, the query mapper 1020 maps the incoming query to one or more native queries to be used for retrieving the data required for processing the incoming query. Other data source types may require the incoming query to be mapped to a set of API calls for retrieving the required data. This step will be described later in more detail with reference to FIG. 12.

At step 1130, the data accessor 1025 uses the mapped native queries or API calls to retrieve the required data from the data source 115. The incoming query is then evaluated on this data in step 1135. At step 1140, the data serialiser 1030 serialises the result into XML and returns the result to the client application 130.

Figure 7:
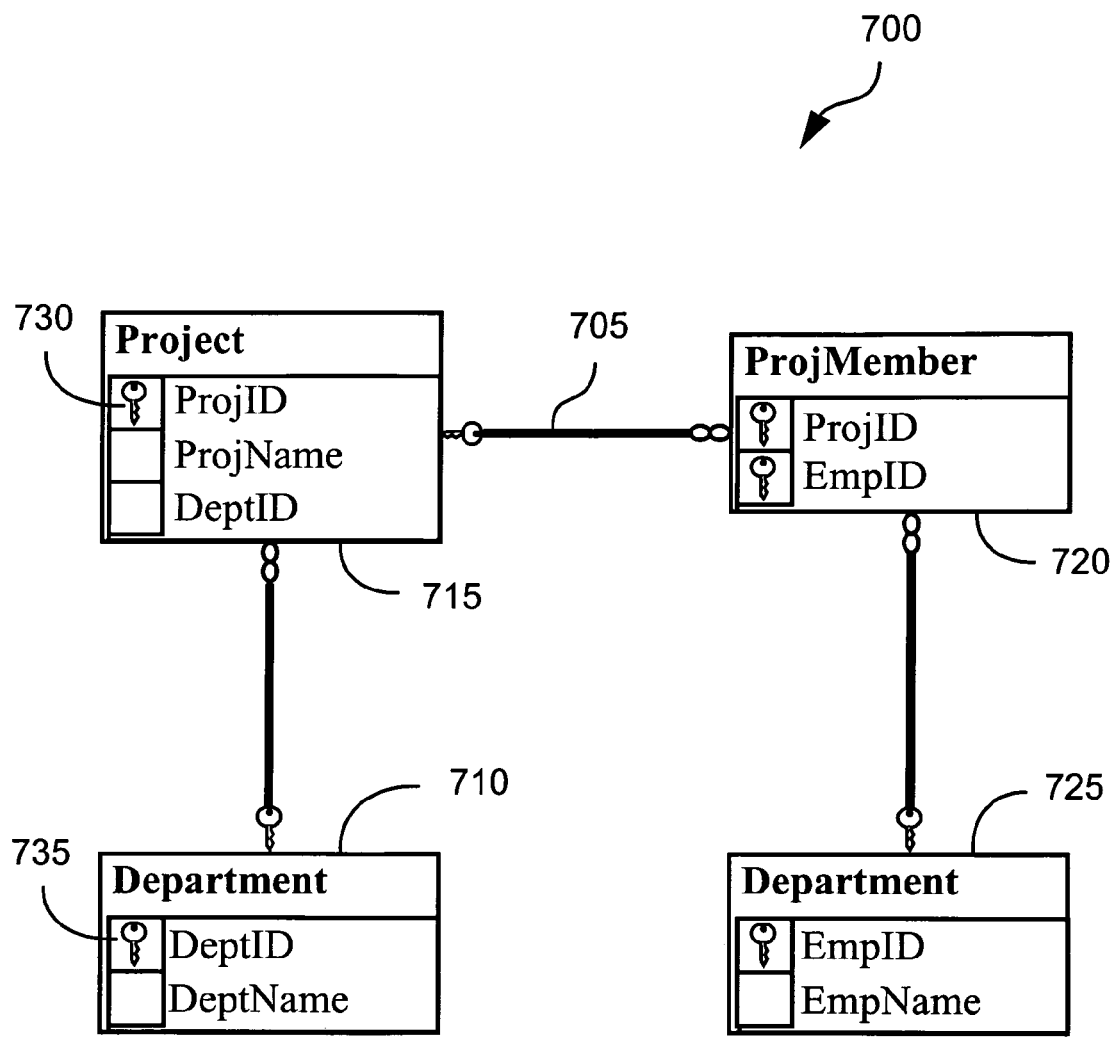
FIG. 7 is a schema diagram of the example Company database used for illustrating the various methods.
Figure 12:
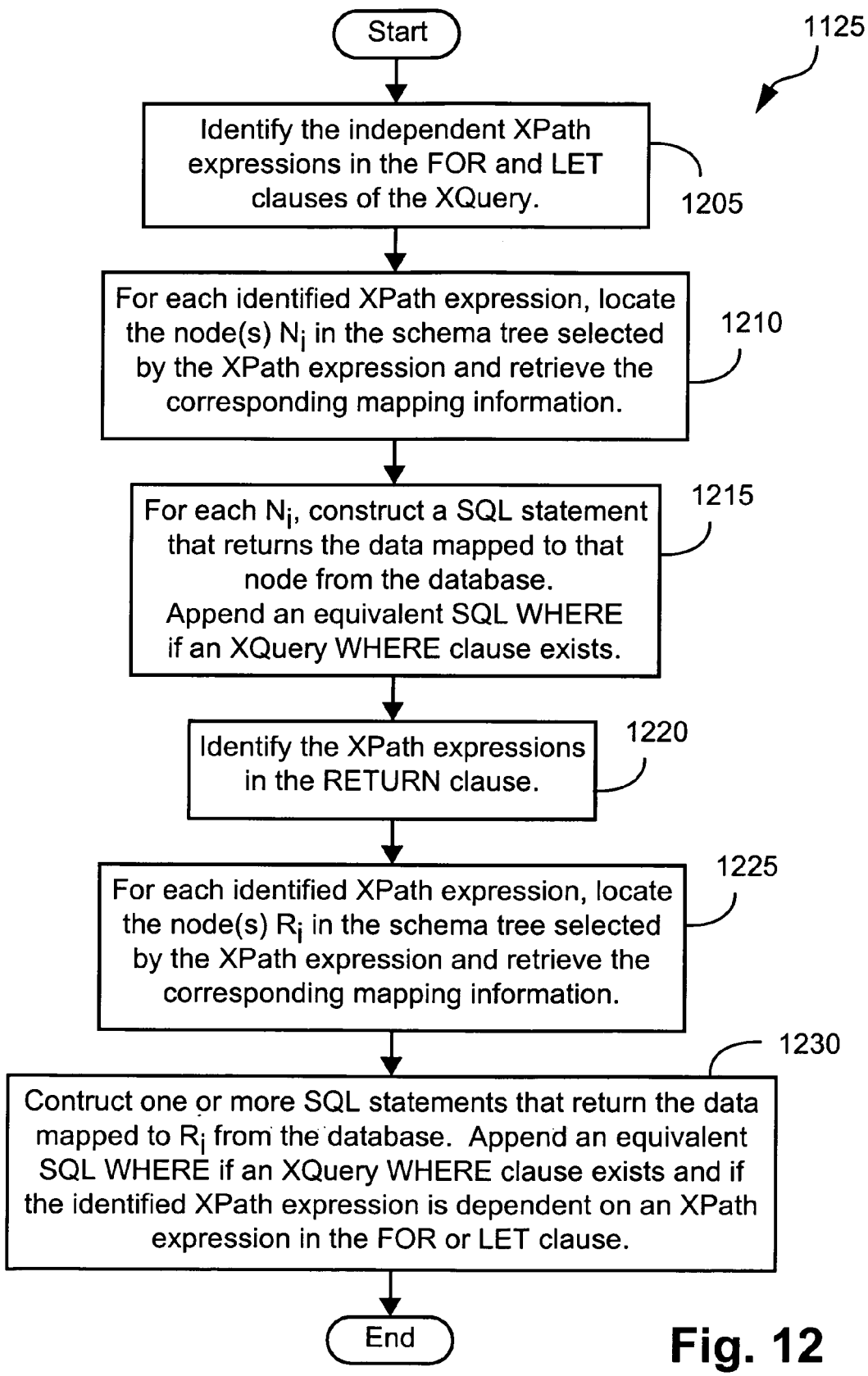
FIG. 12 is a flowchart showing the expanded details of a step in FIG. 11 for mapping an XQuery to SQL statements for retrieving the required data for processing the XQuery.

Step 1125 will now be described with reference to a relational data source and illustrated with an example using the Company database depicted in FIG. 7 as the data source. The flowchart in FIG. 12 shows the steps of the mapping method performed in step 1125. XQuery utilises XPath expressions for selecting data to be retrieved and processed. At step 1205, the query mapper 1020 identifies the independent XPath expressions in the FOR and LET clauses of the XQuery. In the XQuery example below for querying the Company relational database data source:

```
<RDProjects>
    for $i in /DataSource/DepartmentItems/Department
    let $j := $i/Project
        where $i/DeptName = "Research"
            or $i/DeptName = "Development"
    return { $j/ProjName }
</RDProjects>
```

The independent XPath expression in the FOR and LET clauses is /DataSource/DepartmentItems/Department. Only independent XPath expressions are required to be identified for mapping to native queries because the dependent expressions can be derived from the independent ones.

In step 1210, the node(s) $N_i$ in the schema tree selected by these XPath expressions are located and the corresponding mapping information is retrieved. In the above example, the Department node in the schema tree is located and the mapping information seen in Appendix B at lines 133-135 for that node is retrieved. At step 1215, the mapping information is used to construct a SQL statement for retrieving the data mapped to $N_i$. If a WHERE clause exists in the XQuery, an equivalent WHERE clause is appended to the SQL statement. If a referenced value in the conditional expression of the XQuery WHERE clause is mapped from a different table, one or more JOIN clauses will be added when constructing this SQL statement to allow the equivalent WHERE clause to be appended. In the case of the above XQuery example, the following SQL statement is constructed for the Department node:

```
SELECT d.*
FROM Department d
WHERE d.DeptName = "Research"
    OR d.DepartName = "Development"
```

At step 1220, the query mapper 1020 identifies the XPath expressions in the RETURN clause of the XQuery. These expressions are usually, but not necessarily, dependent on the XPath expressions identified in the FOR or LET clause. In the example, the XPath expression is $j/ProjName. In step 1225, node(s) $R_j$, being located in the schema tree selected by the identified XPath expressions are located and the corresponding mapping information is retrieved. In the example, the ProjName node in the schema tree is located. At step 1230, a SQL statement is constructed for the $R_j$ nodes that are mapped from the same table, thus multiple SQL statements are required if the data in $R_j$ is mapped from different tables. If $R_j$ is selected by an XPath expression in the RETURN clause that is dependent on an XPath expression in the FOR or LET clause, the tables mapped to the nodes $N_i$ and the nodes between $N_i$ and $R_j$ in the schema tree have to be included when constructing the SQL statement. The required primary key and foreign key information is in the mapping information of these nodes and is used to construct the appropriate JOIN clauses. In the example, the XPath expression in the RETURN clause is $j/ProjName and is dependent on $i/Project and ultimately /DataSource/DepartmentItems/Department in the FOR and LET clauses. Using the mapping information retrieved from the nodes Department, Project and ProjName, the following SQL statement is constructed to select the data that maps to ProjName and to join the tables that map to Department and Project:

```
SELECT d.DeptID, p.ProjName
FROM Department d JOIN Project p
ON d.DeptID = p.DeptID
WHERE d.DeptName = "Research"
    OR d.DeptName = "Development
```

When evaluating an XQuery, the query processor 1015 uses the result sets returned by the SQL statements mapped from the XPath expressions in the FOR and RETURN clauses to iterate the data to be processed and to process and output the result respectively.

The method of generating a data server 110 described above with reference to a relational data source 115 can also be used to generate data servers for other types of data source. Mapping information specific to the data source type has to be generated in step 210 or 410. With the appropriate mapping information in the generated XML Schema 1005, the query mapper 1020 is able to map an XQuery to the required native queries or API calls. These native queries or API calls are then used by the data accessor 1025 to retrieve the required data for processing the query. Advantageously, a data server 110 is deployed with the appropriate data source type specific query mapper 1020 and data accessor 1025 components in step 235 or 420.

The method of generating a data server will now be described with reference to a hierarchical data source, such as, for example, a messaging server like Microsoft® Exchange Server or a mail client like Outlook™ folders manufactured by Microsoft Corporation. As the method is substantially the same as for a relational data source, the description largely emphasises on the generation and the use of the mapping information specific to a hierarchical data source.

Figure 13:
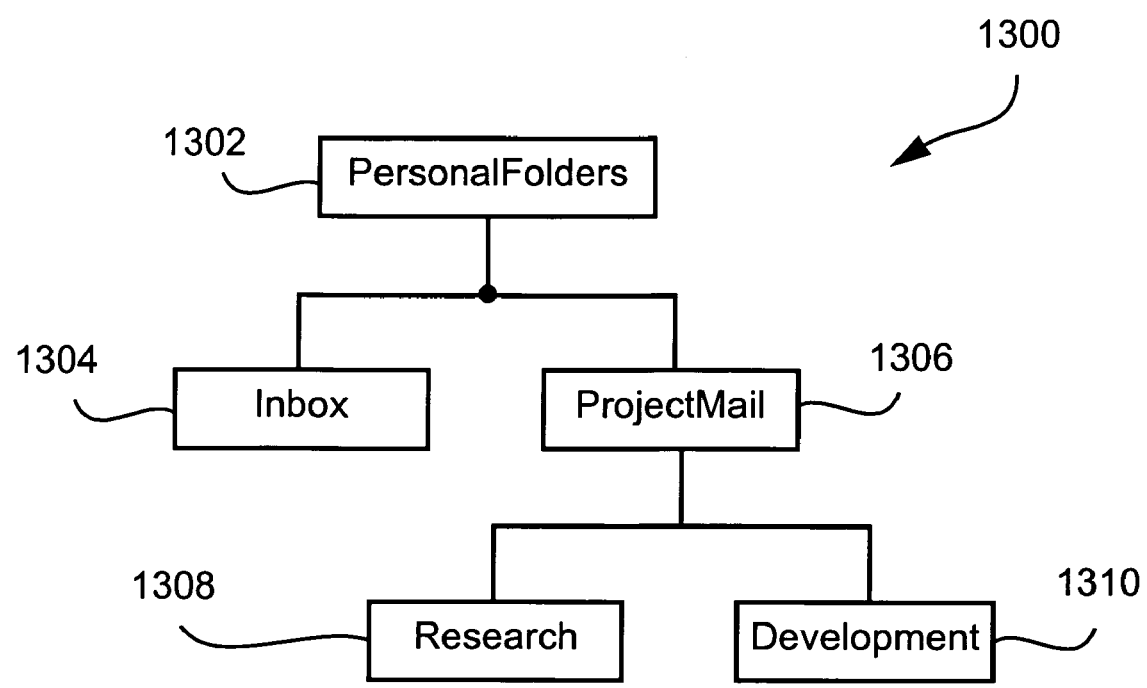
FIG. 13 is a graphical diagram showing the hierarchy of a set of example Outlook mail folders.

FIG. 13 shows a hierarchy 1300 of a set of mail folders in a typical mail client. In the top level folder, PersonalFolders 1302, there are two mail folders, Inbox 1304 and ProjectMail 1306. The ProjectMail folder 1306 contains the subfolders, Research 1308 and Development 1310, which contain mail of the respective project. The folder hierarchy of a typical messaging server user usually contains more folders which also hold other types of information, such as contacts and tasks, etc. However, a simplified subset is sufficient here for illustration of the hierarchical application of the method.

The methods 200 and 400 are substantially the same for a mail client data source with steps 210 and 410 generating a default XML Schema as depicted in Appendix E. As with the default XML Schema generated for the Company relational database as shown in Appendix B, the mdbas:Settings element of Appendix E at lines 12-15 in the global mapping information annotation element contains details of the data source, i.e., the type of the data source is Outlook™ and the user name of the Outlook™ user. There is a global xs:complexType specifying the data that is kept in each type of folder. Only the mail folder xs:complexType of Appendix E at lines 180-192 is shown in the XML Schema.

The global element DataSource of the schema is the start of the mail client folder's hierarchy. Unlike the global element of Appendix B at lines 69-127 of the XML Schema generated for the Company database, the global element DataSource does not contain multiple sub-trees for providing multiple views of the data source as there is essentially a one-to-one mapping from a hierarchical data source to an XML Schema. The DataSource element contains the child element PersonalFolders seen in Appendix E at lines 157-176 which contains the child elements Inbox at line 160 and ProjectMail at lines 161-173. The ProjectMail element further contains the child elements Research at line 166 and Development at line 167.

The global element DataSource has a child xs:annotation element in Appendix E at lines 24-154 that contains the mapping information of the mail client data. This mapping information contains mapping definitions in the mdbas:Mapping elements, such as in Appendix E at lines 99-101, lines 94-96, lines 65-67 and lines 30-32 etc. Those mapping elements specify the mapping of an element from the mail client data source in terms of a path. The mapping definitions are used by the query mapper 1020 to map an XQuery to the required API calls for retrieving the required data from the mail client.

The method 1100 of processing an XQuery by a data server 110 generated for a mail client data source is substantially the same as described for a relational data source except for some variations in steps 1125 and 1130. At step 1125, the query mapper 1020 maps each independent XPath expression in the XQuery by firstly looking up the mapping definitions of the elements selected by the expression. Secondly, the query mapper 1020 uses the mapping definitions to form a path that specifies the required data in the mail client. For example, the XPath expression //Research/Message will select the: /Data-Source/PersonalFolders/ProjectMail/Research/Message element. The path of the data in mail client that maps to this element can be determined by locating this element in the schema tree initialised in step 1105 and retrieving the mapping definitions of this element and its ancestors, such as in Appendix E at lines 99-101, lines 94-96, lines 65-67 and lines 30-32. These mapping definitions are used to form the path PersonalFolders/ProjectMail/Research/Message which corresponds to a series of API calls required to navigate the mail folders to the data. At step 1130, the data accessor 1025 invokes the appropriate API calls to retrieve the data required for processing the XQuery.

If a predefined XML Schema is used and it contains the required mapping information copied from the default XML Schema as described with reference to FIG. 5, the query processing is substantially the same as described above with reference to FIG. 11.

If a predefined XML Schema is used in conjunction with a transformation XQuery, as described in the alternative implementations involving a predefined schema, an extra step of rewriting the incoming XQuery expressed in terms of the predefined XML Schema to an equivalent XQuery expressed in terms of the default XML Schema is required. This additional step will now be described using the same incoming XQuery as used for the relational data source example.

The additional step involves rewriting the incoming XQuery such that the absolute path expressions are replaced with XQuery expressions in terms of the default XML Schema. For the incoming XQuery:

```
<RDProjects>
    for $i in /DataSource/DepartmentItems/Department
    let $j := $i/Project
        where $i/DeptName = "Research"
            or $i/DeptName = "Development"
    return { $j/ProjName }
</RDProjects>
it may be rewritten as:
<RDProjects>
    let $dept :=
        for $d in /DataSource/DepartmentItems/Department
        return
            <Department>
            {
                <Name>
                {
                    $d/DeptName/text( )
                }
                </Name>
            }
            {
                for $e in $d/Project/ProjMember/Employee
                return
                    <Employee>
                    {
                        <ID>
                        {
                            $e/EmpID/text( )
                        }
                        </ID>
                    }
                    {
                        <Name>
                        {
                            $e/EmpName/text( )
                        }
```

-continued

```
                        </Name>
                    }
                    </Employee>
            }
            </Department>
    for $i in $dept
    let $j := $i/Project
        where $i/DeptName = "Research"
            or $i/DeptName = "Development"
    return { $j/ProjName }
</RDProjects>
```

Note that the absolute path expression in the incoming XQuery "/DataSource/DepartmentItems/Department" is replaced with the variable $dept. This variable is defined in a LET clause and its value is bound to the XQuery expressed in terms of the default XML Schema for returning the elements specified by the original path expression. The rewritten XQuery is now expressed in terms of the default XML Schema. This XQuery can then be processed as previously described with reference to FIG. 11.

As shown in the description of the methods 200 and 400 of generating a data server and the method 1100 of processing an XQuery by a generated data server, with reference to both a relational and a hierarchical data source, the methods can be used for data sources that are relational or hierarchical. As will be understood by those of skill in the art, the processes described may be embodied in other specific forms or extended to cover other types of data source without departing from the essential characteristics thereof.

Figure 16:
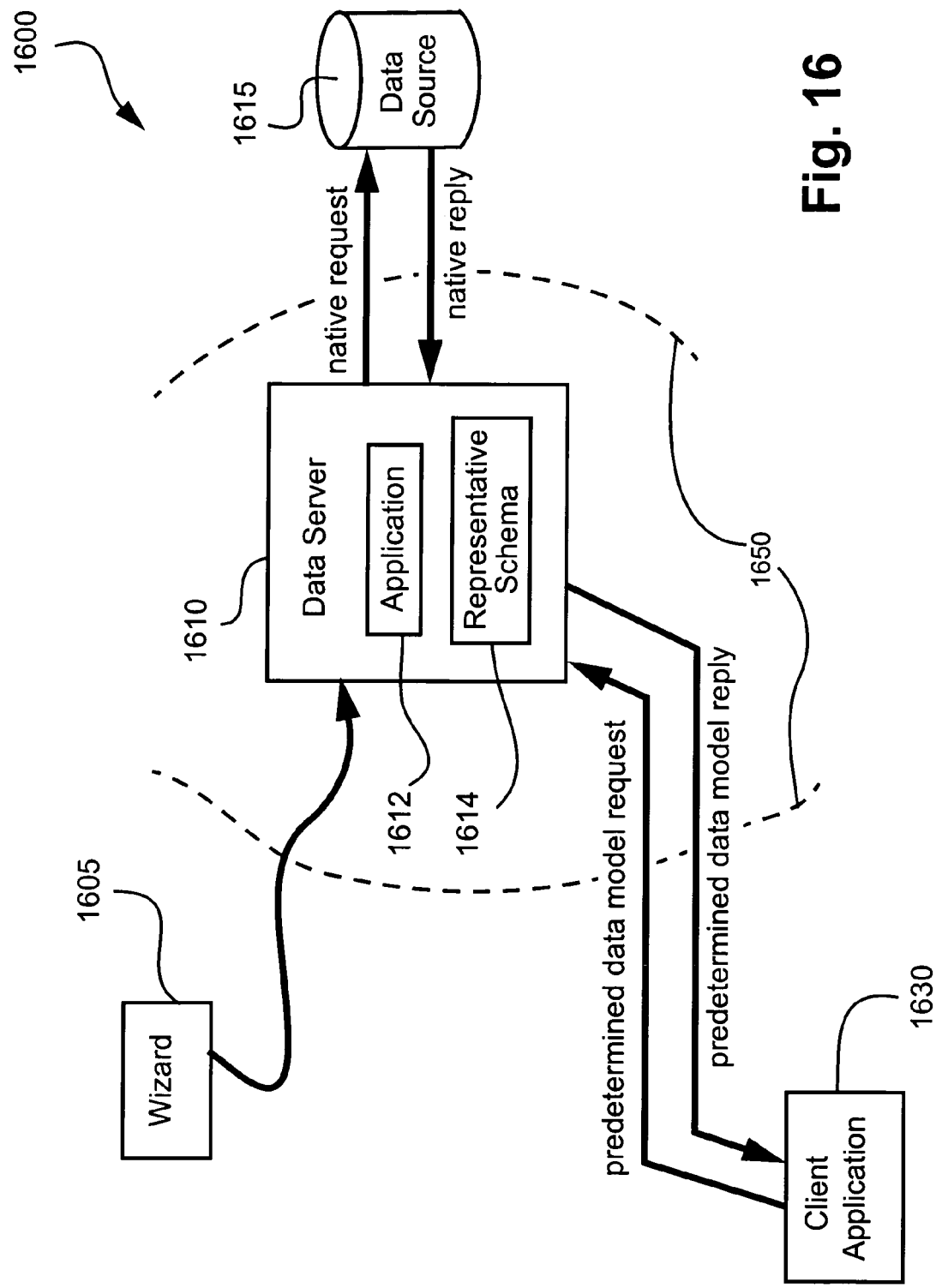
FIG. 16 shows a more generic system architecture for accessing heterogeneous data sources.

FIG. 16 shows a representation similar to FIG. 1 however in a more generic form where a query system 1600 is formed by a wizard 1605 operating to form a data server 1610 arranged to serve data from a data source 1615 to a client application 1630, each of the wizard 1605, the client application 1630, the data server 1610 and the data source 1615 being linked by a communications network 1650. The data source 1615 has native data types and data arranged in a data structure. The wizard 1605 operates to firstly identify the data source 1615 over the network 1650. The wizard 1605 further provides an application program for traversing and examining at least one of the data structure and data of the identified data source 1615. The application program is operable to generate a representative schema 1614 comprising mapping data for converting the native data types to predetermined data types of a common data model. The wizard 1605 further operates to create a server application 1612 adapted to use the representative schema 1614 to convert the data from the native data types to the predetermined data types and to serve the data to the client application 1630 according to the common data model over the network 1650. The representative schema 1614 and the server application 1612 thereby form the data server 1610 generated by the wizard 1605. Once formed, the data server 1610 may receive and respond to queries from the client application 1630, which may have no knowledge of the native data types, but which are directed to the data source 1615.

INDUSTRIAL APPLICABILITY

The arrangements described are applicable to the computer and data processing industries and particular for extracting data from heterogenous data sources.

The foregoing describes only some embodiments of the present invention, and modifications and/or changes can be made thereto without departing from the scope and spirit of the invention, the embodiments being illustrative and not restrictive.

APPENDIX A

```xml
<?xml version="1.0" encoding="UTF-8"?>
<xs:schema targetNamespace="http://www.cisra.com.au/MDBA/Namespace/
                                               munoz/Company"
    xmlns:xs="http://www.w3.org/2001/XMLSchema"
    xmlns:rm="http://www.cisra.com.au/MDBA/SchemaMap/RelationalDBMapping"
    xmlns:mdbas="http://www.cisra.com.au/MDBA/Settings"
    xmlns="http://www.cisra.com.au/MDBA/Namespace/munoz/Company"
                                               elementFormDefault="qualified">
    <xs:annotation>
        <xs:appinfo>
            <mdbas:Settings>
            </mdbas:Settings>
            <mdbas:MappingInfo>
            </mdbas:MappingInfo>
        </xs:appinfo>
    </xs:annotation>
    <xs:element name="DataSource">
        <xs:complexType>
            <xs:sequence>
                <xs:element name="Element1Items">
                    <xs:complexType>
                        <xs:sequence>
                            <xs:element name="Element1" type="Element1"
                                minOccurs="0" maxOccurs="unbounded"/>
                        </xs:sequence>
                    </xs:complexType>
                </xs:element>
                <xs:element name="Element2Items">
                    <xs:complexType>
                        <xs:sequence>
                            <xs:element name="Element2" type="Element2"
                                minOccurs="0" maxOccurs="unbounded"/>
                        </xs:sequence>
                    </xs:complexType>
                </xs:element>
            </xs:sequence>
        </xs:complexType>
    </xs:element>
    <xs:complexType name="Element1">
        <xs:annotation>
            <xs:appinfo>
                <mdbas:MappingInfo>
                </mdbas:MappingInfo>
                <mdbas:MappingInfo>
                </mdbas:MappingInfo>
            </xs:appinfo>
        </xs:annotation>
        <xs:sequence>
            <xs:element name="Element1Child1"/>
            <xs:element name="Element1Child2"/>
        </xs:sequence>
    </xs:complexType>
    <xs:complexType name="Element2">
        <xs:annotation>
            <xs:appinfo>
                <mdbas:MappingInfo>
                </mdbas:MappingInfo>
                <mdbas:MappingInfo>
                </mdbas:MappingInfo>
            </xs:appinfo>
        </xs:annotation>
        <xs:sequence>
            <xs:element name="Element2Child1"/>
            <xs:element name="Element2Child2"/>
        </xs:sequence>
    </xs:complexType>
</xs:schema>
```

APPENDIX B

```xml
<?xml version="1.0" encoding="UTF-8"?>
<xs:schema targetNamespace="http://www.cisra.com.au/MDBA/Namespace/
                                                munoz/Company"
xmlns:xs="http://www.w3.org/2001/XMLSchema"
xmlns:rm="http://www.cisra.com.au/MDBA/SchemaMap/RelationalDBMapping"
xmlns:mdbas="http://www.cisra.com.au/MDBA/Settings"
xmlns="http://www.cisra.com.au/MDBA/Namespace/munoz/Company"
                                                elementFormDefault="qualified">
    <xs:annotation>
        <xs:appinfo>
            <mdbas:Settings>
                <mdbas:DataSrcType>Relational Databases</mdbas:DataSrcType>
                <rm:ServerType>Microsoft SQL Server</rm:ServerType>
                <rm:ServerName>munoz</rm:ServerName>
                <rm:DatabaseName>Company</rm:DatabaseName>
                <rm:DefaultUserName>sa</rm:DefaultUserName>
                <rm:DefaultPassword/>
            </mdbas:Settings>
            <mdbas:MappingInfo>
                <mdbas:Mapping>
                    <rm:TableName>Department</rm:TableName>
                    <rm:PrimaryKeyField>DeptID</rm:PrimaryKeyField>
                    <rm:ReferenceFromTable rm:MappingID="1">
                        <rm:TableName>Project</rm:TableName>
                        <rm:ForeignKeyField>DeptID</rm:ForeignKeyField>
                    </rm:ReferenceFromTable>
                </mdbas:Mapping>
                <mdbas:Mapping>
                    <rm:TableName>Employee</rm:TableName>
                    <rm:PrimaryKeyField>EmpID</rm:PrimaryKeyField>
                    <rm:ReferenceFromTable rm:MappingID="2">
                        <rm:TableName>ProjMember</rm:TableName>
                        <rm:ForeignKeyField>EmpID</rm:ForeignKeyField>
                    </rm:ReferenceFromTable>
                </mdbas:Mapping>
                <mdbas:Mapping>
                    <rm:TableName>Project</rm:TableName>
                    <rm:PrimaryKeyField>ProjID</rm:PrimaryKeyField>
                    <rm:ReferenceToTable rm:MappingID="3">
                        <rm:TableName>Department</rm:TableName>
                        <rm:ForeignKeyField>DeptID</rm:ForeignKeyField>
                    </rm:ReferenceToTable>
                    <rm:ReferenceFromTable rm:MappingID="4">
                        <rm:TableName>ProjMember</rm:TableName>
                        <rm:ForeignKeyField>ProjID</rm:ForeignKeyField>
                    </rm:ReferenceFromTable>
                </mdbas:Mapping>
                <mdbas:Mapping>
                    <rm:TableName>ProjMember</rm:TableName>
                    <rm:PrimaryKeyField>ProjID</rm:PrimaryKeyField>
                    <rm:PrimaryKeyField>EmpID</rm:PrimaryKeyField>
                    <rm:ReferenceToTable rm:MappingID="5">
                        <rm:TableName>Employee</rm:TableName>
                        <rm:ForeignKeyField>EmpID</rm:ForeignKeyField>
                    </rm:ReferenceToTable>
                    <rm:ReferenceToTable rm:Mapping ID="6">
                        <rm:TableName>Project</rm:TableName>
                        <rm:ForeignKeyField>ProjID</rm:ForeignKeyField>
                    </rm:ReferenceToTable>
                </mdbas:Mapping>
            </mdbas:MappingInfo>
        </xs:appinfo>
    </xs:annotation>
    <xs:import namespace="http://www.cisra.com.au/MDBA/Settings"
                            schemaLocation="MDBASettings.xsd"/>
    <xs:import namespace="http://www.cisra.com.au/MDBA/SchemaMap/
                    RelationalDBMapping" schemaLocation="RelationalDBMapping.xsd"/>
    <xs:element name="DataSource">
    <xs:complexType>
        <xs:sequence>
            <xs:element name="DepartmentItems">
                <xs:complexType>
                    <xs:sequence>
                        <xs:element name="Department" type="Department"
                                minOccurs="0" maxOccurs="unbounded">
                            <xs:key name="DepartmentKey">
                                <xs:selector xpath="."/>
                                <xs:field xpath="DeptID"/>
                            </xs:key>
```

APPENDIX B-continued

```xml
                </xs:element>
            </xs:sequence>
        </xs:complexType>
    </xs:element>
    <xs:element name="EmployeeItems">
        <xs:complexType>
            <xs:sequence>
                <xs:element name="Employee" type="Employee"
                    minOccurs="0" maxOccurs="unbounded">
                    <xs:key name="EmployeeKey">
                        <xs:selector xpath="."/>
                        <xs:field xpath="EmpID"/>
                    </xs:key>
                </xs:element>
            </xs:sequence>
        </xs:complexType>
    </xs:element>
    <xs:element name="ProjectItems">
        <xs:complexType>
            <xs:sequence>
                <xs:element name="Project" type="Project"
                    minOccurs="0" maxOccurs="unbounded">
                    <xs:key name="ProjectKey">
                        <xs:selector xpath="."/>
                        <xs:field xpath="ProjID"/>
                    </xs:key>
                </xs:element>
            </xs:sequence>
        </xs:complexType>
    </xs:element>
    <xs:element name="ProjMemberItems">
        <xs:complexType>
            <xs:sequence>
                <xs:element name="ProjMember" type="ProjMember"
                    minOccurs="0" maxOccurs="unbounded">
                    <xs:key name="ProjMemberKey">
                        <xs:selector xpath="."/>
                        <xs:field xpath="ProjID"/>
                        <xs:field xpath="EmpID"/>
                    </xs:key>
                </xs:element>
            </xs:sequence>
        </xs:complexType>
    </xs:element>
            </xs:sequence>
        </xs:complexType>
</xs:element>
<xs:complexType name="Department">
    <xs:annotation>
        <xs:appinfo>
            <mdbas:MappingInfo>
                <mdbas:ComplexType>Department</mdbas:ComplexType>
                <mdbas:Mapping>
                    <rm:TableName>Department</rm:TableName>
                </mdbas:Mapping>
            <mdbas:MappingInfo>
                <mdbas:Element>DeptID</mdbas:Element>
                <mdbas:Mapping>
                    <rm:TableName>Department</rm:TableName>
                    <rm:FieldName>DeptID</rm:FieldName>
                </mdbas:Mapping>
            </mdbas:MappingInfo>
            <mdbas:MappingInfo>
                <mdbas:Element>DeptName</mdbas:Element>
                <mdbas:Mapping>
                    <rm:TableName>Department</rm:TableName>
                    <rm:FieldName>DeptName</rm:FieldName>
                </mdbas:Mapping>
            </mdbas:MappingInfo>
            <mdbas:MappingInfo>
                <mdbas:Element>Project</mdbas:Element>
                <mdbas:Mapping>
                    <rm:MappingID>1</rm:MappingID>
                </mdbas:Mapping>
            </mdbas:MappingInfo>
            </mdbas:MappingInfo>
        </xs:appinfo>
    </xs:annotation>
    <xs:sequence>
```

APPENDIX B-continued

```
<xs:element name="DeptID">
    <xs:simpleType>
        <xs:restriction base="xs:string">
            <xs:maxLength value="10"/>
        </xs:restriction>
    </xs:simpleType>
</xs:element>
<xs:element name="DeptName">
    <xs:simpleType>
        <xs:restriction base="xs:string">
            <xs:maxLength value="50"/>
        </xs:restriction>
    </xs:simpleType>
</xs:element>
<xs:element name="Project" type="Project" minOccurs="0"
                                          maxOccurs="unbounded"/>
        </xs:sequence>
    </xs:complexType>
<xs:complexType name=Employee">
    <xs:annotation>
        <xs:appinfo>
            <mdbas:MappingInfo>
                <mdbas:ComplexType>Employee</mdbas:ComplexType>
                <mdbas:Mapping>
                    <rm:TableName>Employee</rm:TableName>
                </mdbas:Mapping>
                <mdbas:MappingInfo>
                    <mdbas:Element>EmpID</mdbas:Element>
                    <mdbas:Mapping>
                        <rm:TableName>Employee</rm:TableName>
                        <rm:FieldName>EmpID</rm:FieldName>
                    </mdbas:Mapping>
                </mdbas:MappingInfo>
                <mdbas:MappingInfo>
                    <mdbas:Element>EmpName</mdbas:Element>
                    <mdbas:Mapping>
                        <rm:TableName>Employee</rm:TableName>
                        <rm:Field Name>EmpName</rm:Field Name>
                    </mdbas:Mapping>
                </mdbas:MappingInfo>
                <mdbas:MappingInfo>
                    <mdbas:Element>ProjMember</mdbas:Element>
                    <mdbas:Mapping>
                        <rm:MappingID>2</rm:MappingID>
                    </mdbas:Mapping>
                </mdbas:MappingInfo>
            </mdbas:MappingInfo>
        </xs:appinfo>
    </xs:annotation>
    <xs:sequence>
        <xs:element name="Emp ID" type="xs:int"/>
        <xs:element name="EmpName">
            <xs:simpleType>
                <xs:restriction base="xs:string">
                    <xs:maxLength value="50"/>
                </xs:restriction>
            </xs:simpleType>
        </xs:element>
        <xs:element name="ProjMember" type="ProjMember" minOccurs="0"
                                                       maxOccurs="unbounded"/>
    </xs:sequence>
</xs:complexType>
<xs:complexType name="Project">
    <xs:annotation>
        <xs:appinfo>
            <mdbas:MappingInfo>
                <mdbas:ComplexType>Project</mdbas:ComplexType>
                <mdbas:Mapping>
                    <rm:TableName>Project</rm:TableName>
                </mdbas:Mapping>
                <mdbas:MappingInfo>
                    <mdbas:Element>ProjID</mdbas:Element>
                    <mdbas:Mapping>
                        <rm:TableName>ProjecID</rm:TableName>
                        <rm:FieldName>ProjID</rm:FieldName>
                    </mdbas:Mapping>
                </mdbas:MappingInfo>
                <mdbas:MappingInfo>
                    <mdbas:Element>ProjName</mdbas:Element>
```

APPENDIX B-continued

```xml
                <mdbas:Mapping>
                    <rm:TableName>Project</rm:TableName>
                    <rm:FieldName>ProjName</rm:FieldName>
                </mdbas:Mapping>
            </mdbas:MappingInfo>
            <mdbas:MappingInfo>
                <mdbas:Element>DeptID</mdbas:Element>
                <mdbas:Mapping>
                    <rm:TableName>Project</rm:TableName>
                    <rm:Field Name>DeptID</rm:FieldName>
                </mdbas:Mapping>
            </mdbas:MappingInfo>
            <mdbas:MappingInfo>
                <mdbas:Element>Department</mdbas:Element>
                <mdbas:Mapping>
                    <rm:MappingID>3</rm:MappingID>
                </mdbas:Mapping>
            </mdbas:MappingInfo>
            <mdbas:MappingInfo>
                <mdbas:Element>ProjMember</mdbas:Element>
                <mdbas:Mapping>
                    <rm:Mapping ID>4</rm:MappingID>
                </mdbas:Mapping>
            </mdbas:MappingInfo>
        </mdbas:MappingInfo>
    </xs:appinfo>
</xs:annotation>
<xs:sequence>
    <xs:element name="ProjID">
        <xs:simpleType>
            <xs:restriction base="xs:string">
                <xs:maxLength value="10"/>
            </xs:restriction>
        </xs:simpleType>
    </xs:element>
    <xs:element name="ProjName">
        <xs:simpleType>
            <xs:restriction base="xs:string">
                <xs:maxLength value="50"/>
            </xs:restriction>
        </xs:simpleType>
    </xs:element>
    <xs:element name="DeptID" minOccurs="0">
        <xs:simpleType>
            <xs:restriction base="xs:string">
                <xs:maxLength value="10"/>
            </xs:restriction>
        </xs:simpleType>
    </xs:element>
    <xs:element name="Department" type="Department" minOccurs="0"/>
    <xs:element name="ProjMember" type="ProjMember"
        minOccurs="0" maxOccurs="unbounded"/>
</xs:sequence>
</xs:complexType>
<xs:complexType name="ProjMember">
    <xs:annotation>
        <xs:appinfo>
            <mdbas:MappingInfo>
                <mdbas:ComplexType>ProjMember</mdbas:ComplexType>
                <mdbas:Mapping>
                    <rm:TableName>ProjMember</rm:TableName>
                </mdbas:Mapping>
                <mdbas:MappingInfo>
                    <mdbas:Element>ProjID</mdbas:Element>
                    <mdbas:Mapping>
                        <rm:TableName>ProjMember</rm:TableName>
                        <rm:Field Name>ProjID</rm:FieldName>
                    </mdbas:Mapping>
                </mdbas:MappingInfo>
                <mdbas:MappingInfo>
                    <mdbas:Element>EmpID</mdbas:Element>
                    <mdbas:Mapping>
                        <rm:TableName>ProjMember</rm:TableName>
                        <rm:FieldName>EmpID</rm:FieldName>
                    </mdbas:Mapping>
                </mdbas:MappingInfo>
                <mdbas:MappingInfo>
<mdbas:Element>Employee</mdbas:Element>
<mdbas:Mapping>
```

APPENDIX B-continued

```
                <rm:MappingID>5</rm:MappingID>
            </mdbas:Mapping>
        </mdbas:MappingInfo>
        <mdbas:MappingInfo>
            <mdbas:Element>Project</mdbas:Element>
            <mdbas:Mapping>
                <rm:Mapping ID>6</rm:MappingID>
            </mdbas:Mapping>
        </mdbas:MappingInfo>
    </mdbas:MappingInfo>
        </xs:appinfo>
    </xs:annotation>
    <xs:sequence>
        <xs:element name="ProjID" minOccurs="0">
            <xs:simpleType>
                <xs:restriction base="xs:string">
                    <xs:maxLength value="10"/>
                </xs:restriction>
            <xs:simpleType>
        </xs:element>
        <xs:element name="EmpID" type="xs:int" minOccurs="0"/>
        <xs:element name="Employee" type="Employee" minOccurs="0"/>
        <xs:element name="Project" type="Project" minOccurs="0"/>
    </xs:sequence>
    </xs:complexType>
</xs:schema>
```

APPENDIX C

```
<?xml version="1.0" encoding="UTF-8"?>
<xs:schema xmlns:xs="http://www.w3.org/2001/XMLSchema"
                    elementFormDefault="qualified" attributeFormDefault="unqualified">
    <xs:element name="DepartmentInfo">
        <xs:complexType>
            <xs:sequence>
                <xs:element name="Department" minOccurs="0" maxOccurs="unbounded">
                    <xs:complexType>
                        <xs:sequence>
                            <xs:element name="Name" type="xs:string"/>
                            <xs:element name="Employee" minOccurs="0"
                                                maxOccurs="unbounded">
                                <xs:complexType>
                                    <xs:sequence>
                                        <xs:element name="ID" type="xs:string"/>
                                        <xs:element name="Name" type="xs:string"/>
                                    </xs:sequence>
                                </xs:complexType>
                            </xs:element>
                        </xs:sequence>
                    </xs:complexType>
                </xs:element>
            </xs:sequence>
        </xs:complexType>
    </xs:element>
</xs:schema>
```

APPENDIX D

```
<?xml version="1.0" encoding="UTF-8"?>
xs:schema xmlns:xs="http://www.w3.org/2001/XMLSchema"
                    elementFormDefault="qualified" attributeFormDefault="unqualified">
    <xs:annotation>
        <xs:appinfo>
            <mdbas:Settings>
                <mdbas:DataSrcType>Relational Databases</mdbas:DataSrcType>
                <rm:ServerType>Microsoft SQL Server</rm:ServerType>
                <rm:ServerName>munoz</rm:ServerName>
                <rm:DatabaseName>Company</rm:DatabaseName>
                <rm:UserName>sa</rm:UserName>
                <rm:Password/>
            </mdbas:Settings>
            <mdbas:MappingInfo>
                <mdbas:Mapping>
                    <rm:TableName>Department</rm:TableName>
```

APPENDIX D-continued

```xml
            <rm:PrimaryKeyField>DeptID</rm:PrimaryKeyField>
            <rm:ReferenceFromTable rm:MappingID="1">
                <rm:TableName>Project</rm:TableName>
                <rm:ForeignKeyField>DeptID</rm:ForeignKeyField>
            </rm:ReferenceFromTable>
        </mdbas:Mapping>
        <mdbas:Mapping>
            <rm:TableName>Employee</rm:TableName>
            <rm:PrimaryKeyField>EmpID</rm:PrimaryKeyField>
            <rm:ReferenceFromTable rm:MappingID="2">
                <rm:TableName>ProjMember</rm:TableName>
                <rm:ForeignKeyField>EmpID</rm:ForeignKeyField>
            </rm:ReferenceFromTable>
        </mdbas:Mapping>
        <mdbas:Mapping>
            <rm:TableName>Project</rm:TableName>
            <rm:PrimaryKeyField>ProjID</rm:PrimaryKeyField>
            <rm:ReferenceToTable rm:MappingID="3">
                <rm:TableName>Department</rm:TableName>
                <rm:ForeignKeyField>DeptID</rm:ForeignKeyField>
            </rm:ReferenceToTable>
            <rm:ReferenceFromTable rm:MappingID="4">
                <rm:TableName>ProjMember</rm:TableName>
                <rm:ForeignKeyField>ProjID</rm:ForeignKeyField>
            </rm:ReferenceFromTable>
        </mdbas:Mapping>
        <mdbas:Mapping>
            <rm:TableName>ProjMember</rm:TableName>
            <rm:PrimaryKeyField>ProjID</rm:PrimaryKeyField>
            <rm:PrimaryKeyField>EmpID</rm:PrimaryKeyField>
            <rm:ReferenceToTable rm:MappingID="5">
                <rm:TableName>Employee</rm:TableName>
                <rm:ForeignKeyField>EmpID</rm:ForeignKeyField>
            </rm:ReferenceToTable>
            <rm:ReferenceToTable rm:MappingID=6">
                <rm:TableName>Project</rm:TableName>
                <rm:ForeignKeyField>ProjID</rm:ForeignKeyField>
            </rm:ReferenceToTable>
        </mdbas:Mapping>
    </mdbas:MappingInfo>
        </xs:appinfo>
    </xs:annotation>
    <xs:import namespace="http://www.cisra.com.au/MDBA/Settings"
                    schemaLocation="MDBASettings.xsd"/>
    <xs:import namespace="http://www.cisra.com.au/MDBA/SchemaMap
            /RelationalDBMapping" schemaLocation="RelationalDBMapping.xsd"/>
<xs:element name="DepartmentInfo">
    <xs:annotation>
        <xs:appinfo>
            <mdbas:MappingInfo>
                <mdbas:Element>Department</mdbas:Element>
                <mdbas:Mapping>
                    <rm:TableName>Department</rm:TableName>
                </mdbas:Mapping>
                <mdbas:MappingInfo>
                    <mdbas:Element>Name</mdbas:Element>
                    <mdbas:Mapping>
                        <rm:TableName>Department</rm:TableName>
                        <rm:FieldName>DeptName</rm:FieldName>
                    </mdbas:Mapping>
                </mdbas:MappingInfo>
                <mdbas:MappingInfo>
                    <mdbas:Element>Employee</mdbas:Element>
                    <mdbas:Mapping>
                        <rm:TableName>Employee</rm:TableName>
                    </mdbas:Mapping>
                    <mdbas:Mapping>
                        <rm:MappingID>2</rm:MappingID>
                    </mdbas:Mapping>
                    <mdbas:Mapping>
                        <rm:TableName>ProjMember</rm:TableName>
                    </mdbas:Mapping>
                    <mdbas:Mapping>
                        <rm:MappingID>6</rm:MappingID>
                    </mdbas:Mapping>
                    <mdbas:Mapping>
                        <rm:TableName>Project</rm:TableName>
                    </mdbas:Mapping>
                    <mdbas:Mapping>
```

APPENDIX D-continued

```
                    <rm:MappingID>3</rm:MappingID>
                </mdbas:Mapping>
                <mdbas:MappingInfo>
                    <mdbas:Element>ID</mdbas:Element>
                    <mdbas:Mapping>
                        <rm:TableName>Employee</rm:TableName>
                        <rm:FieldName>EmpID</rm:FieldName>
                    </mdbas:Mapping>
                </mdbas:MappingInfo>
            <mdbas:MappingInfo>
                <mdbas:Element>Name</mdbas:Element>
                <mdbas:Mapping>
                    <rm:TableName>Employee</rm:TableName>
                    <rm:FieldName>EmpName</rm:FieldName>
                </mdbas:Mapping>
            </mdbas:MappingInfo>
            </mdbas:MappingInfo>
        </mdbas:MappingInfo>
    </xs:appinfo>
 </xs:annotation>
 <xs:complexType>
    <xs:sequence>
        <xs:element name="Department" minOccurs="0" maxOccurs="unbounded">
            <xs:complexType>
                <xs:sequence>
                    <xs:element name="Name" type="xs:string"/>
                    <xs:element name="Employee" minOccurs="0"
                                        maxOccurs="unbounded">
                        <xs:complexType>
                            <xs:sequence>
                                <xs:element name="ID" type="xs:string"/>
                                <xs:element name="Name" type="xs:string"/>
                            </xs:sequence>
                        </xs:complexType>
                    </xs:element>
                </xs:sequence>
            </xs:complexType>
        </xs:element>
    </xs:sequence>
 </xs:complexType>
 </xs:element>
</xs:schema>
```

APPENDIX E

```
<?xml version="1.0" encoding="UTF-8"?>
<xs:schema targetNamespace="http://www.cisra.com.au/MDBA/Namespace/
                                    munoz/Mailbox"
xmlns:xs="http://www.w3.org/2001/XMLSchema"
xmlns:ol="http://www.cisra.com.au/MDBA/SchemaMap/OutlookMapping"
xmlns:mdbas=http://www.cisra.com.au/MDBA/Settings"
xmlns="http://www.cisra.com.au/MDBA/Namespace/munoz/Mailbox"
                            elementFormDefault="qualified">
    <xs:annotation>
        <xs:appinfo>
            <mdbas:Settings>
                <mdbas:DataSrcType>Outlook</mdbas:DataSrcType>
                <ol:UserName>samc</ol:UserName>
            </mdbas:Settings>
            <mdbas:MappingInfo/>
        </xs:appinfo>
    </xs:annotation>
    <xs:import namespace="http://www.cisra.com.au/MDBA/Settings"
                schemaLocation="MDBASettings.xsd"/>
    <xs:import namespace="http://www.cisra.com.au/MDBA/SchemaMap
                /RelationalDBMapping" schemaLocation="RelationalDBMapping.xsd"/>
    <xs:element name="DataSource">
        <xs:annotation>
            <xs:appinfo>
                <mdbas:MappingInfo>
                    <mdbas:Element>DataSource</mdbas:Element>
                    <mdbas:MappingInfo>
                        <mdbas:Element>PersonalFolders</mdbas:Element>
                        <mdbas:Mapping>
                            <ol:Path>PersonalFolders</ol:Path>
                        </mdbas:Mapping>
```

APPENDIX E-continued

```
<mdbas:MappingInfo>
    <mdbas:Element>Inbox</mdbas:Element>
    <mdbas:Mapping>
        <ol:Path>Inbox</ol:Path>
    </mdbas:Mapping>
    <mdbas:MappingInfo>
        <mdbas:Element>Message</mdbas:Element>
        <mdbas:Mapping>
            <ol:Path>Message</ol:Path>
        </mdbas:Mapping>
        <mdbas:MappingInfo>
            <mdbas:Element>From</mdbas:Element>
            <mdbas:Mapping>
                <ol:Path>From</ol:Path>
            </mdbas:Mapping>
        </mdbas:MappingInfo>
        <mdbas:MappingInfo>
            <mdbas:Element>Subject</mdbas:Element>
            <mdbas:Mapping>
                <ol:Path>Subject</ol:Path>
            </mdbas:Mapping>
        </mdbas:MappingInfo>
        <mdbas:MappingInfo>
            <mdbas:Element>Body</mdbas:Element>
            <mdbas:Mapping>
                <ol:Path>Body</ol:Path>
            </mdbas:Mapping>
        </mdbas:MappingInfo>
    </mdbas:MappingInfo>
</mdbas:MappingInfo>
<mdbas:MappingInfo>
    <mdbas:Element>ProjectMail</mdbas:Element>
    <mdbas:Mapping>
        <ol:Path>ProjectMail</ol:Path>
    </mdbas:Mapping>
    <mdbas:MappingInfo>
        <mdbas:Element>Message</mdbas:Element>
        <mdbas:Mapping>
            <ol:Path>Message</ol:Path>
        </mdbas:Mapping>
        <mdbas:MappingInfo>
            <mdbas:Element>From</mdbas:Element>
            <mdbas:Mapping>
                <ol:Path>From</ol:Path>
            </mdbas:Mapping>
        </mdbas:MappingInfo>
        <mdbas:MappingInfo>
            <mdbas:Element>Subject</mdbas:Element>
            <mdbas:Mapping>
                <ol:Path>Subject</ol:Path>
            </mdbas:Mapping>
        </mdbas:MappingInfo>
        <mdbas:MappingInfo>
            <mdbas:Element>Body</mdbas:Element>
            <mdbas:Mapping>
                <ol:Path>Body</ol:Path>
            </mdbas:Mapping>
        </mdbas:MappingInfo>
    </mdbas:MappingInfo>
</mdbas:MappingInfo>
<mdbas:MappingInfo>
    <mdbas:Element>Research</mdbas:Element>
    <mdbas:Mapping>
        <ol:Path>Research</ol:Path>
    </mdbas:Mapping>
    <mdbas:MappingInfo>
        <mdbas:Element>Message</mdbas:Element>
        <mdbas:Mapping>
            <ol:Path>Message</ol:Path>
        </mdbas:Mapping>
        <mdbas:MappingInfo>
            <mdbas:Element>From</mdbas:Element>
            <mdbas:Mapping>
                <ol:Path>From</ol:Path>
            </mdbas:Mapping>
        </mdbas:MappingInfo>
        <mdbas:MappingInfo>
            <mdbas:Element>Subject</mdbas:Element>
            <mdbas:Mapping>
                <ol:Path>Subject</ol:Path>
```

APPENDIX E-continued

```
                        </mdbas:Mapping>
                    </mdbas:MappingInfo>
                    <mdbas:MappingInfo>
                        <mdbas:Element>Body</mdbas:Element>
                        <mdbas:Mapping>
                            <ol:Path>Body</ol:Path>
                        </mdbas:Mapping>
                    </mdbas:MappingInfo>
                </mdbas:MappingInfo>
            </mdbas:MappingInfo>
            <mdbas:MappingInfo>
                <mdbas:Element>Development</mdbas:Element>
                <mdbas:Mapping>Development</mdbas:Mapping>
                <mdbas:MappingInfo>
                    <mdbas:Element>Message</mdbas:Element>
                    <mdbas:Mapping>
                        <ol:Path>Message</ol:Path>
                    </mdbas:Mapping>
                    <mdbas:MappingInfo>
                        <mdbas:Element>From</mdbas:Element>
                        <mdbas:Mapping>
                            <ol:Path>From</ol:Path>
                        </mdbas:Mapping>
                    </mdbas:MappingInfo>
                    <mdbas:MappingInfo>
                        <mdbas:Element>Subject</mdbas:Element>
                        <mdbas:Mapping>
                            <ol:Path>Subject</ol:Path>
                        </mdbas:Mapping>
                    </mdbas:MappingInfo>
                    <mdbas:MappingInfo>
                        <mdbas:Element>Body</mdbas:Element>
                        <mdbas:Mapping>
                            <ol:Path>Body</ol:Path>
                        </mdbas:Mapping>
                    </mdbas:MappingInfo>
                </mdbas:MappingInfo>
            </mdbas:MappingInfo>
        </mdbas:MappingInfo>
    </xs:appinfo>
</xs:annotation>
<xs:complexType>
    <xs:sequence>
        <xs:element name="PersonalFolders">
            <xs:complexType>
                <xs:sequence>
                    <xs:element name="Inbox" type="MailFolder"/>
                    <xs:element name="ProjectMail">
                        <xs:complexType>
                            <xs:complexContent>
                                <xs:extension base="MailFolder">
                                    <xs:sequence>
                                        <xs:element name="Research" type="MailFolder"/>
                                        <xs:element name="Development"
                                                    type="MailFolder"/>
                                    </xs:sequence>
                                </xs:extension>
                            </xs:complexContent>
                        </xs:complexType>
                    </xs:element>
                </xs:sequence>
            </xs:complexType>
        </xs:element>
    </xs:sequence>
</xs:complexType>
</xs:element>
<xs:complexType name="MailFolder">
    <xs:sequence>
        <xs:element name="Message" minOccurs="0" maxOccurs="unbounded">
            <xs:complexType>
                <xs:sequence>
                    <xs:element name="From" type="xs:string"/>
                    <xs:element name="Subject" type="xs:string"/>
                    <xs:element name="Body" type="xs:string"/>
                </xs:sequence>
            </xs:complexType>
        </xs:element>
```

APPENDIX E-continued

```
    </xs:sequence>
  </xs:complexType>
</xs:schema>
```

We claim:

1. A computer-implemented method of serving data between a database and a client application, wherein said database comprises data of a native data type which is arranged in a data structure, said method comprising the steps of:

examining said database;

generating a default schema, wherein the default schema comprises mapping data for converting said data of said native data type to a predetermined data type of a common data model, and wherein said default schema provides a plurality of representations of the data structure of the database;

displaying the generated default schema and the data of the native data type graphically;

adding an annotation to the default schema, wherein said annotation comprises a child element that identifies the database;

mapping at least one of a first element and a first attribute of the default schema to at least a respective one of a second element and a second attribute of a predetermined schema, wherein the mapping is responsive to a mapping instruction, and wherein said predetermined schema includes an annotation copied from the annotation of the default schema;

using a computer to create a server application to use said predetermined schema to convert said data of said native data type to data of said predetermined data type;

parsing, according to said server application, a query according to the common data model;

mapping said parsed query, using said server application, to form a data request of the data of said native data type to be sent to the database;

retrieving a required portion of the data from said database in response to said received query;

converting said response data according to said server application to form a response to said query according to said common data model; and returning said response to said client application.

2. A method according to claim 1, further comprising the step of deploying said server application on a network to enable access to data on said database by said client application over the network.

3. A method according to claim 2 further comprising the step of accessing said deployed server application using a Uniform Resource Identifier (URI).

4. A method according to claim 1, wherein said default schema and the predetermined schema each respectively comprise an XML Schema, wherein said query comprises an XQuery, and wherein said response comprises an XML result.

5. A method according to claim 1 wherein said database is one of:

(a) a relational database; and
(b) an ODBC data source
(c) a hierarchical directory of files
(d) a Microsoft Exchange Server and Outlook mailbox
(e) a delimited text file;
(f) a native XML database; and
(g) a Lotus Notes database.

6. A method according to claim 1, wherein said default schema and the predetermined schema each respectively use a hierarchical data model.

7. A method according to claim 6 wherein said hierarchical data model is an XML Schema.

8. A method according to claim 1, wherein said default schema, said predetermined schema and said server application thereby form a data server for said database.

9. A computer-implemented method of serving data between a plurality of databases and a client application, wherein each of said databases respectively comprises data of a native data type which is arranged in a data structure, said method comprising the steps of:

examining at least one of the plurality of databases;

generating a corresponding default schema for said examined database, wherein said corresponding default schema comprises mapping data for converting said native data type to a predetermined data type of a common data model, and wherein said corresponding default schema provides a plurality of representations of the data structure of the database;

displaying the generated default schema and the data of the native data type graphically;

adding an annotation to the default schema, wherein said annotation comprises a child element that identifies the database;

mapping at least one of a first element and a first attribute of the default schema to at least a respective one of a second element and a second attribute of a predetermined schema, wherein the mapping is responsive to a mapping instruction, and wherein said predetermined schema includes an annotation copied from the annotation of the default schema;

using a computer to create a server application to use said corresponding predetermined schema to convert the data of said native data type in said examined database to data of said predetermined data type, and to serve said data according to said common data model over said network;

parsing, according to said server application, a query of said examined database according to said common data model;

mapping said parsed query, using said server application, to form a data request of the data of said native data type to be sent to the examined database;

retrieving a required portion of the data from said examined database in response to said received query;

converting said response data according to said server application to form a response to said query according to said common data model; and returning said response to said client application.

10. A method according to claim 9 further comprising the step of deploying each server application created for a respective database on said network.

11. A method according to claim 10 further comprising the step of accessing one deployed server application using a Uniform Resource Identifier (URI).

12. A method according to claim 9, wherein said default schema and the predetermined schema each respectively comprise an XML Schema, wherein said query comprises an XQuery, and wherein said response comprises an XML result.

13. A method according to claim 9, wherein said mapping data indicates relationships between the data of the native data type in the database and provides a plurality of selectable views of the data in said database.

14. A method according to claim 9, wherein said response includes a view of said data from said examined database.

15. A computer readable storage medium having a computer application program recorded thereon executable to make a computer serve data between a plurality of databases and a client application, wherein each of said databases respectively comprises data of a native data type which is arranged in a data structure, said application program comprising:
   code for examining at least one of the plurality of databases;
   code for generating a corresponding default schema for said examined database, wherein said corresponding default schema comprises mapping data for converting said native data type of said examined database to a predetermined data type of a common data model, and wherein said corresponding default schema provides a plurality of representations of the data structure of the database;
   code for displaying the generated default schema and the data of the native data type graphically;
   code for adding an annotation to the default schema, wherein said annotation comprises a child element that identifies the database;
   code for mapping at least one of a first element and a first attribute of the default schema to at least a respective one of a second element and a second attribute of a predetermined schema, wherein the mapping is responsive to a mapping instruction, and wherein said predetermined schema includes an annotation copied from the annotation of the default schema;
   code for creating a server application to use said corresponding predetermined schema to convert said data of said native data type in said examined database to data of said predetermined data type, and to serve said data according to said common data model;
   code for parsing, according to said server application, a query of said examined database according to said common data model;
   code for mapping said parsed query, using said server application, to form a data request of the data of said native data type to be sent to the examined database;
   code for retrieving a required portion of the data from said examined database in response to said received query;
   code for converting said response data according to said server application to form a response to said query according to said common data model; and
   code for returning said response to said client application.

16. A computer readable storage medium according to claim 15, wherein said representative schema and said server application thereby form a data server for said database.

17. A computer readable storage medium according to claim 16, wherein said server application is deliverable to a first computer and executable on said first computer to form at least one instance of said data server on a second computer, and wherein both said computers form part of a network.

18. A computer readable storage medium according to claim 17 wherein said client application is resident and operable from a third computer and at least one of said plurality of databases is resident on upon one of a fourth computer or said second computer.

19. A computer readable storage medium according to claim 15, wherein said application program further comprises code for executing each of said generating code, said examining code, said creating code, said displaying code, said adding code, said element and attribute mapping code, said parsing code, said query mapping code, said retrieving code, said converting code and said returning code over each of the plurality of databases.

20. A computer apparatus comprising a processor and a memory for storing an application program, wherein the application program is executable by the processor to control said apparatus to serve data between a plurality of databases and a client application, wherein each of said databases comprises data of a native data type which is arranged in a data structure, and wherein the execution of the application program thereby affords said apparatus:
   means for examining at least one of the plurality of databases;
   means for generating a corresponding default schema for said examined database, wherein said corresponding default schema comprises mapping data for converting said native data type of said database to a predetermined data type of a common data model, and wherein said corresponding default schema provides a plurality of representations of the data structure of the database;
   means for displaying the generated default schema and the data of the native data type graphically;
   means for adding an annotation to the default schema, wherein said annotations comprises a child element that identifies the database;
   means for mapping at least one of a first element and a first attribute of the default schema to at least a respective one of a second element and a second attribute of a predetermined schema, wherein the mapping is responsive to a mapping instruction, and wherein said predetermined schema includes an annotation copied from the annotation of the default schema;
   means for creating a server application to use said corresponding predetermined schema to convert said data from said native data type in said examined database to data of said predetermined data type, and to serve said data according to said common data model;
   means for parsing, according to said server application, a query of said examined database according to said common data model;
   means for mapping said parsed query, using said server application, to form a data request of the data of said native data type to be sent to the examined database;
   means for retrieving a required portion of the data from said examined database in response to said received query;
   means for converting said response data according to said server application to form a response to said query according to said common data model; and
   means for returning said response to said client application.

* * * * *